United States Patent [19]
Yamamoto et al.

[11] Patent Number: 6,103,387
[45] Date of Patent: *Aug. 15, 2000

[54] THERMOSETTING COMPOSITIONS, METHODS OF COATING AND COATED ARTICLES

[75] Inventors: Toshio Yamamoto, Yokohama; Masahiro Sano, Yokosuka; Hiroki Mizutani, Chigasaki; Keiji Komoto, Yokohama; Masahiro Ishidoya, Chigasaki, all of Japan

[73] Assignee: NOF Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/849,545

[22] PCT Filed: Oct. 14, 1996

[86] PCT No.: PCT/JP96/02971

§ 371 Date: Jun. 10, 1997

§ 102(e) Date: Jun. 10, 1997

[87] PCT Pub. No.: WO97/13809

PCT Pub. Date: Apr. 17, 1997

[30] Foreign Application Priority Data

Oct. 13, 1995 [JP] Japan ................... 7-291924
Nov. 29, 1995 [JP] Japan ................... 7-332541
Jan. 23, 1996 [JP] Japan ................... 8-027390
Jan. 23, 1996 [JP] Japan ................... 8-027391

[51] Int. Cl.$^7$ .......................... B32B 27/18; B32B 27/00; B05D 1/36; C08L 33/14
[52] U.S. Cl. ................... 428/482; 427/387; 427/388.2; 427/407.1; 427/419.5; 428/412; 428/413; 428/419; 428/423.1; 428/446; 525/206; 525/208; 525/209; 525/212; 525/217; 525/220; 525/221; 525/223; 525/437; 525/438; 525/440; 525/446; 528/25; 528/26; 528/27; 528/28
[58] Field of Search .................. 427/387, 419.5, 427/419.3, 388.2, 388.4, 385.5, 407.1; 428/423.1, 480, 482, 500, 412, 413, 419, 446; 528/25, 26, 27, 28, 87, 44, 77, 78; 525/208, 212, 437, 438, 440, 446, 217, 220, 221, 223, 230, 209, 206, 444

[56] References Cited

U.S. PATENT DOCUMENTS

| | | | |
|---|---|---|---|
| 3,505,297 | 4/1970 | Sheetz et al. | 525/326.8 |
| 4,190,687 | 2/1980 | Sugiura et al. | 427/389 |
| 4,254,185 | 3/1981 | Buter | 427/385.5 |
| 4,345,057 | 8/1982 | Yamabe et al. | 526/247 |
| 4,371,667 | 2/1983 | Möller et al. | 525/208 |
| 4,579,937 | 4/1986 | Masuda et al. | 528/363 |
| 4,650,718 | 3/1987 | Simpson et al. | 428/413 |
| 4,652,470 | 3/1987 | Das et al. | 427/409 |
| 4,681,811 | 7/1987 | Simpson et al. | 428/413 |
| 4,703,101 | 10/1987 | Singer et al. | 528/87 |
| 4,764,430 | 8/1988 | Blackburn et al. | 428/413 |
| 4,781,940 | 11/1988 | Denton, Jr. | 427/2.27 |
| 4,910,097 | 3/1990 | Nomura et al. | 427/388.4 |
| 5,116,644 | 5/1992 | Asai et al. | 427/352 |
| 5,169,915 | 12/1992 | Mohri et al. | 526/247 |
| 5,216,081 | 6/1993 | Mohri et al. | 525/199 |
| 5,239,028 | 8/1993 | Nakagawa et al. | 526/265 |
| 5,419,929 | 5/1995 | Ishidoya et al. | 427/385.5 |
| 5,494,645 | 2/1996 | Tayama et al. | 427/508 |
| 5,661,219 | 8/1997 | Nakane et al. | |

FOREIGN PATENT DOCUMENTS

| | | |
|---|---|---|
| 029 595 | 6/1981 | European Pat. Off. . |
| 63-63726 | 3/1988 | Japan . |
| 4-173882 | 6/1992 | Japan . |
| 4-292677 | 10/1992 | Japan . |
| 4-339868 | 11/1992 | Japan . |

OTHER PUBLICATIONS

Derwent Patent Abstract of JP 51–114429 (1976) Oct.
Derwent Patent Abstract of JP 60–88038 (1985) May.
Derwent Patent Abstract of JP 2–115238 (1990) Apr.
Derwent Patent Abstract of JP 1–104646 (1989) Apr.
Derwent Patent Abstract of JP 57–34107 (1982).
Derwent Patent Abstract of JP 61–12760 (1986).
Derwent Patent Abstract of JP 4–279612 (1992).
Derwent Patent Abstract of JP 1–261409 (1989).
Derwent Patent Abstract of JP 2–3468 (1990).

Primary Examiner—Diana Dudash
Attorney, Agent, or Firm—Frishauf, Holtz, Goodman, Langer & Chick, P.C.

[57] ABSTRACT

A thermosetting composition comprises (A) a compound having in the molecule two or more carboxyl groups blocked by a vinyl ether compound, a vinyl thioether compound or a hetero compound having a vinyl type double bond and oxygen or sulfur as the hetero atom, (B) a compound having in the molecule two or more reactive functional groups which can form chemical bonds with the blocked carboxyl groups, and (C) a dispersing component of at least one inorganic oxide sol selected from the group consisting of aluminium oxide sol, silica sol, zirconium oxide sol and antimony oxide sol, and optionally (D) a thermal latent acid catalyst which is activated during curing the composition by heating. A method of coating and a coated article comprise applying the composition. The obtained paint film has excellent weathering resistance, stain resistance, stain-removing property, chemical resistance, moisture resistance and excellent appearance.

14 Claims, No Drawings

THERMOSETTING COMPOSITIONS, METHODS OF COATING AND COATED ARTICLES

FIELD OF TECHNOLOGY

The present invention relates to a novel thermosetting composition, a method of coating and a coated article. More particularly, it relates a thermosetting composition comprising a ceramic ingredient, which gives a cured product having excellent stain resistance, stain-removing property, weathering resistance, light resistance, chemical resistance, moisture resistance and appearance and is excellent in environment protection property and safety, a method of coating and a coated article.

BACKGROUND TECHNOLOGY

It is generally known that thermosetting compositions are prepared from compounds having carboxyl groups and compounds having reactive functional groups which can form chemical bonds with the carboxyl groups by heating, such as epoxy group, oxazoline group, silanol group, alkoxysilane group, hydroxyl group, amino group, imino group, isocyanate group, blocked isocyanate group, cyclocarobonate group, vinyl ether group, vinyl thioether group, aminomethylol group, alkylated aminomethylol group, acetal group and ketal group.

As the thermosetting compositions described above, for example, compositions comprising combination of carboxyl groups and epoxy groups have been disclosed in Laid Open Japanese Patent Application Showa 51-114429, Laid Open European Patent Application 29595 and U.S. Pat. Nos. 4,371,667, 4,650,718, 4,681,811, 4,703,101 and 4,764,430.

The compositions comprising combination of carboxyl groups and oxazoline groups have been disclosed in U.S. Pat. No. 3,505,297 and Laid Open Japanese Patent Applications Showa 60-88038 and Heisei 2-115238.

The thermosetting compositions give cured products having excellent chemical properties, physical properties and weathering resistance and are widely utilized in the field of coatings, ink, adhesives and molded articles.

However, the reactivity between the carboxyl group and the reactive functional groups is high so that compositions in which compounds having carboxyl groups and compounds having the reactive functional groups exist together have problems that the compositions are gelled during storage and the period suitable for pot life is short.

The compounds comprising carboxyl groups conventionally utilized for thermosetting compositions described above have problems that solubility to generally used organic solvents is low and that compatibility to the compounds having reactive groups, which react with the carboxyl group, is inferior because of the property of the carboxyl group capable of forming strong hydrogen bonds. When the thermosetting compositions are utilized as top coating compositions, there are naturally have problems that preparation of coating composition of high solid content is difficult and that appearance of the finished coat is inferior.

For the purpose of solving these problems, it was proposed that carboxyl group was blocked by converting it to tertiary-butyl ester and the ester was decomposed by heating, and the free carboxyl group was regenerated by elimination of isobutene (Laid Open Japanese Patent Application Heisei 1-104646).

However, this method is not sufficiently satisfactory in view of resource saving and energy saving because of the requirement of a high temperature, such as 170–200° C., for the heat decomposition of the tertiary-butyl ester. And also, this method is not sufficiently satisfactory because of the problem that pock marks which were made by foaming and degassing of isobutene formed by the decomposition remained on the cured surface of the coating.

In recent years, many oil droplets and dusts have existed in air by environmental changes such as air pollution. As the result, some problems have occurred, among which paint film on buildings, automobiles and the like are easier to be stained than former and it's stain is difficult to remove. Thus, it has been desired that paint films have resistance to the stain, i.e. stain resistance and property to remove stain from stained paint films, i.e. stain-removing property. In such circumstances, it is desired to produce coating compositions which give paint films having excellent stain resistance, stain-removing property, weathering resistance, light resistance, gloss, appearance, water resistance and chemical resistance and is excellent in environment protection property and safety property.

Convenient leading coating compositions having stain resistance, which have been used, comprise a fluorine-containing resin as a main component. The stain resistance of the coating compositions is attributed to excellent weathering resistance and water repellency of the fluorine-containing resin, as explained the following. The fluorine-containing resin manifest the performance by (1) light, heat and chemical stabilities caused by larger bond energy between fluorine atom and carbon atom compared with that between hydrogen atom and carbon atom and (2) water repellency and oil repellency caused by larger atomic radius of fluorine atom compared with that of hydrogen atom and lower surface free energy attributed to lower polarizability between fluorine atoms ($0.68 \times 10^{-24}$ cc).

In order to increase solubility to a solvent in using the fluorine-containing resin for a coating composition, a copolymer of a fluoro olefin and a vinyl ether monomer such as cyclohexyl vinyl ether (described in Laid Open Japanese Patent Applications Showa 57-34107) and a resin mixture of a fluorine-containing resin and an acrylic copolymer (described in Laid Open Japanese Patent Applications Showa 61-12760) were known. But, these do not manifest sufficiently the excellent weathering resistance and the stain resistance characteristic of the fluorine-containing resin because of the small amount of the portion based on fluorine-containing monomers.

Also, in order to improve the weathering resistance and the stain resistance of the fluorine-containing resin for a coating composition, a copolymer of a fluoro olefin, a β-methyl substituted-α-olefin, a monomer having a chemical curing reactive group and a monomer having an ester group in a side chain was proposed (Laid Open Japanese Patent Applications Heisei 4-279612). But, the satin-removing resistance is not still sufficient.

On the other hand, a coating composition, which gives weathering resistance with an acrylic polyol produced by reacting a polymerizable monomer having stability to ultra-violet rays as essential component, is near recently suggested as a coating composition having excellent weathering resistance (Laid Open Japanese Patent Application Publication Heisei 1-261409). But, there is no description about stain resistance in this publication.

A coating composition comprising a partially condensate of an organic silicon compound and a specific silica praticulate was suggested as a composition having stain resistance (Laid Open Japanese Patent Applications Heisei 2-3468). But, there is no detailed description about a resin ingredient used in the coating composition in the publication.

The inventors have already suggested a thermosetting composition comprising a compound having functional groups in which carboxyl groups are blocked with vinyl ethers, and a compound having reactive functional groups which react the functional groups (Laid Open European Patent Application 643112) in order to solve the problems described above. But, a thermosetting composition which gives paint film having further excellent stain resistance, stain-removing property and moisture resistance is needed in some uses.

Thus, a coating composition, which gives paint films having stain resistance, stain-removing property, weathering resistance and light resistance, has been not developed.

The present invention accordingly has an object to provide thermosetting compositions which give cured products having weathering resistance, chemical properties, physical properties, particularly stain resistance and stain-removing property at lower temperatures and have excellent storage stability, and can be utilized as high solid one component coating materials.

Another object of the invention is to provide methods of coating which discharge a small amount of organic solvents into air during coating and give excellent appearance to the finished articles and to provide articles prepared by utilizing the methods of coating.

Extensive investigations undertaken by the present inventors with the objects described above lead to a discovery that the objects can be achieved by a composition comprising: (A) a compound having in the molecule two or more carboxyl groups which are blocked by a specific vinyl ether group, vinyl thioether group or heterocyclic group having vinyl type double bond and oxygen or sulfur as the hetero atom component; (B) a compound having in the molecule two or more reactive functional groups which can form chemical bonds with the blocked carboxyl groups by heating, and (C) a dispersing component of at least one inorganic oxide sol selected from the group consisting of an aluminum oxide sol, a silica sol, a zirconium oxide sol and an antimony oxide sol; and optionally (D) a thermal latent acid catalyst which is activated during curing the composition by heating; or by a composition comprising: (E) a self-crosslinkable compound having in the molecule one or more blocked carboxyl groups and one or more reactive functional groups which can form chemical bonds with the blocked carboxyl groups by heating, and ingredient (C) and optionally, ingredient (A) and/or ingredient (B), and further optionally ingredient (D).

DISCLOSURE OF THE INVENTION

The present invention provides a thermosetting composition which comprises (A) a resin ingredient, (B) a curing agent ingredient and (C) a dispersing component of an inorganic sol.

Further, the present invention provides a thermosetting composition which comprises:

(A) a compound having in the molecule two or more functional groups of the formula (1):

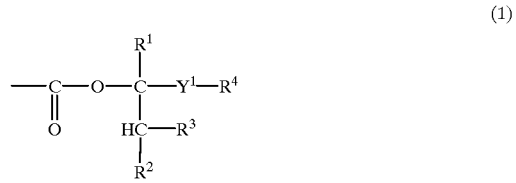

(1)

wherein $R^1$, $R^2$ and $R^3$ are each selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ are optionally bonded with each other to form a heterocyclic structure which comprises $Y^1$ as the hetero atom component;

(B) a compound having in the molecule two or more reactive functional groups which can form chemical bonds with the functional groups of the compound (A); and (C) a dispersing component of at least one inorganic oxide sol selected from the group consisting of an aluminum oxide sol, a silica sol, a zirconium oxide sol and an antimony oxide sol; and optionally (D) a thermal latent acid catalyst which is activated during curing the composition by heating.

Furthermore, the invention provides a thermosetting composition which comprises:

(E) a self-crosslinkable compound having in the molecule (α) one or more functional groups of the formula (2)

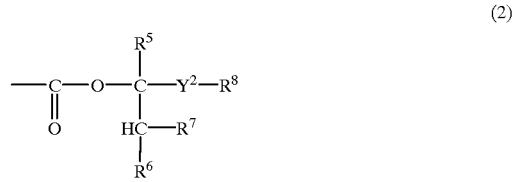

(2)

wherein $R^5$, $R^6$ and $R^7$ are each selected from the group consisting of a hydrogen atom and an organic group of 1 to 18 carbon atoms, $R^8$ is an organic group of 1 to 18 carbon atoms, $Y^2$ is selected from the group consisting of an oxygen atom and a sulfur atom and $R^7$ and $R^8$ are optionally bonded with each other to form a heterocyclic structure which comprises $Y^2$ as the hetero atom component; and (β) one or more reactive functional groups which can form chemical bonds with the functional groups (α); and (C) a dispersing component of at least one inorganic oxide sol selected from the group consisting of an aluminum oxide sol, a silica sol, a zirconium oxide sol and an antimony oxide sol; and optionally, (A) a compound having in the molecule two or more functional groups of the formula (1):

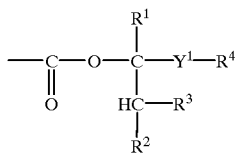

(1)

wherein $R^1$, $R^2$ and $R^3$ are each selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ are optionally bonded with each other to form a heterocyclic structure which comprises $Y^1$ as the hetero atom component; and/or, (B) a compound having in the molecule two or more reactive functional groups which can form chemical bonds with either one or both of the functional group of the formula (2) and the functional group of the formula (1); and further optionally (D) a thermal latent acid catalyst which is activated during curing the composition by heating.

The present invention provides a method of coating which comprises applying a top coating composition comprising a pigment and the thermosetting composition described above on a substrate, the amount of the pigment being in the range from 0 to 300 parts by weight, preferably 0 to 100 parts by weight, based on 100 parts by weight of the total nonvolatile matter of ingredient (A) and ingredient (B) of the thermosetting composition.

The present invention provides a method of coating which comprises coating a substrate with a multilayer paint film by applying a colored film forming composition on the substrate to form a base coat, followed by applying a top coat clear film forming composition on the base coat to form a clear top coat, wherein the clear film forming composition alone or both of the top coat clear film forming composition and the colored film forming composition is a coating composition comprising the thermosetting composition described above.

The present invention provides a method of coating which comprises applying a colored base coating composition on a substrate, followed applying a clear coating composition on the uncured base coat, and baking the base coat and the clear coat, and then applying an over clear coating composition on the clear coat and baking the over clear coat, wherein the clear coating composition is an acrylic resin/aminoplast resin coating composition, and the over clear coating composition is a coating composition comprising any of the thermosetting composition described above.

Also, the present invention provides a coated article applied by the method of coating described above.

Other and further objects, features and advantages of the invention will appear more fully from the following description.

Preferable Embodiment for Practicing the Invention

In the thermosetting composition of the present invention, the resin ingredient used as ingredient (A) includes various resins such as a blocked polycarboxyl compound, an acrylic polyol resin, a polyester polyol resin and a fluororesin (including fluororesins described in the background technology).

In the thermosetting composition of the present invention, various curing agents can be used as the curing ingredient of ingredient (B). The ingredient (B) may be a fluorine-containing compound.

The ingredient (B) may be chemically combined with ingredient (A). The combined compound is a self-crosslinkable compound.

In the thermosetting composition of the present invention, the dispersing component of the inorganic sol used as ingredient (C) includes, for example, a dispersing component of a inorganic oxide sol.

The average particle diameter of the dispersing component of inorganic sol is preferably not more than 100 nm, more preferably not more than 50 nm. The lower bound of the average particle diameter is not limited in the range of formation of the inorganic sol, and preferably 5 or more nm.

The formulation ratio of ingredient (A) to ingredient (B) is arbitrarily selected in the range of the production of the curing product. The equivalent ratio of ingredient (A) to ingredient (B) is generally 0.2:2.0 to 2.0:0.2, preferably 0.6 to 1.6.

The formulation ratio of ingredient (C) is preferably 0.1 to 60% by weight, more preferably 1 to 40% by weight, and most preferably 3 to 40% by weight based on the total amount of nonvolatile matter of ingredient (A) and ingredient (B).

The compound used as ingredient (A) in the thermosetting composition of the present invention is the compound having in the molecule two or more, preferably from 2 to 50 functional groups of the following formula (1):

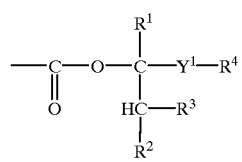

(1)

wherein $R^1$, $R^2$ and $R^3$ are each selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ are optionally bonded with each other to form a heterocyclic structure which comprises $Y^1$ as the hetero atom component. The functional group having the formula (1) is easily prepared by reaction of carboxyl group with a vinyl ether, a vinyl thioether or a heterocyclic compound having oxygen or sulfur as the hetero atom and having a vinyl type double bond which is described by formula (3):

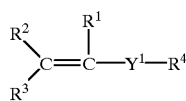

(3)

wherein $R^1$, $R^2$, $R^3$, $R^4$ an $Y^1$ have the same meaning as described above.

In the formula (1) and formula (3), $R^1$, $R^2$ and $R^3$ are selected from the group consisting of a hydrogen atom and an organic group, such as an alkyl group, an aryl group and an alkaryl group of 1 to 18 carbon atoms, $R^4$ is an organic group, such as an alkyl group, an aryl group and an alkaryl group of 1 to 18 carbon atoms. The organic groups may have substituted groups and $R^3$ and $R^4$ may, by bonding together, form a heterocyclic structure with or without substituents and having $Y^1$ as the hetero atom component.

Preferable examples of $R^1$, $R^2$ and $R^3$ are a hydrogen atom, alkyl groups, aryl groups and alkaryl groups of 1 to 10 carbon atoms. Preferable examples of $R^4$ are alkyl groups, aryl groups and alkaryl groups of 1 to 10 carbon atoms.

Suitable examples of the alkyl groups are, for example, methyl, ethyl, n-propyl, isopropyl, n-butyl, isobutyl, tert-butyl, n-pentyl, isopentyl, neopentyl, tert-pentyl, 2-methylbutyl, n-hexyl, isohexyl, 3-methylpentyl, ethylbutyl, n-heptyl, 2-methylhexyl, n-octyl, 2-ethylhexyl, 3-methylheptyl, n-nonyl, methyloctyl, ethylheptyl, n-decyl, n-undecyl, n-dodecyl, n-tetradecyl, n-heptadecyl and n-octadecyl. The alkyl groups also contain cycloalkyl groups such as cyclobutyl and cyclohexyl. Preferable alkyl groups are alkyl groups of 1 to 10 carbon atoms. Examples of the preferable alkyl groups are methyl, ethyl, n-propyl, isopropyl, n-butyl, isobutyl, tert-butyl, n-pentyl, isopentyl, neopentyl, tert-pentyl, 2-methylbutyl, n-hexyl, isohexyl, 3-methylpentyl, ethylbutyl, n-heptyl, 2-methylhexyl, n-octyl, 2-ethylhexyl, 3-methylheptyl, n-nonyl, methyloctyl, ethylheptyl, n-decyl and cyclohexyl.

Also, the alkyl groups contain aralkyl groups. Suitable examples of the aralkyl groups are benzyl, 1-phenylethyl, 2-phenylethyl, 2-phenylpropyl, 3-phenylpropyl, 4-phenylbutyl, 5-phenylpentyl, 6-phenylhexyl, 1-(4-methylphenyl) ethyl, 2-(4-methylphenyl) ethyl and 2-methylbenzyl.

Suitable examples of the aryl groups and the alkaryl groups are, for example, aryl groups such as phenyl, tolyl, xylyl and naphtyl; and alkaryl groups such as 4-methylphenyl, 3,4-dimethylphenyl, 3,4,5-trimethylphenyl, 2-ethylphenyl, n-butylphenyl, tert-butylphenyl, amylphenyl, hexylphenyl, nonylphenyl, 2-tert-butyl-5-methylphenyl, cyclohexylphenyl, cresyl, oxyethylcresyl, 2-methyl-4-tert-butylphenyl and dodecylphenyl. Preferable examples of the aryl groups and the alkaryl groups are aryl groups and alkaryl groups of 6 to 10 carbon atoms such as phenyl, tolyl, xylyl, 4-methylphenyl, 3,4-dimetylphenyl, 3,4,5-trimethylphenyl, 2-ethylphenyl, n-butylphenyl and tert-butylphenyl.

Examples of the compound of the formula (3) include: aliphatic vinyl ethers, such as methyl vinyl ether, ethyl vinyl ether, isopropyl vinyl ether, n-propyl vinyl ether, n-butyl vinyl ether, isobutyl vinyl ether, 2-ethylhexyl vinyl ether and cyclohexyl vinyl ether; aliphatic vinyl thioethers, such as methyl vinyl thioether, ethyl vinyl thioether, isopropyl vinyl thioether, n-propyl vinyl thioether, n-butyl vinyl thioether, isobutyl vinyl thioether, 2-ethylhexyl vinyl thioether and cyclohexyl vinyl thioether; cyclic vinyl ethers, such as 2,3-dihydrofuran, 3,4-dihydrofuran, 2,3-dihydro-2H-pyran, 3,4-dihydro-2H-pyran, 3,4-dihydro-2-methoxy-2H-pyran, 3,4-dihydro-4,4-dimethyl-2H-pyran-2-on, 3,4-dihydro-2-ethoxy-2H-pyran and sodium 3,4-dihydro-2H-pyran-2-carboxylate; and cyclic vinyl thioethers, such as 2,3-dihydrothiophene, 3,4-dihydrothiophene, 2,3-dihydro-2H-thiopyran, 3,4-dihydro-2H-thiopyran, 3,4-dihydro-2-methoxy-2H-thiopyran, 3,4-dihydro-4,4-dimethyl-2H-thiopyran-2-on, 3,4-dihydro-2-ethoxy-2H-thiopyran and sodium 3,4-dihydro-2H-thiopyran-2-carboxylate.

The compound of ingredient (A) is prepared by the reaction of a compound having two or more, preferably 2 to 50, carboxyl groups in the molecule with the compound having the formula (3). Examples of the compound having two or more carboxyl groups in the molecule are: aliphatic polycarboxylic acids, such as succinic acid, adipic acid, azelaic acid, sebacic acid and decamethylenedicarboxylic acid; aromatic polycarboxylic acids, such as phthalic acid, isophathalic acid, terephathalic acid, trimellitic acid and pyromellitic acid; alicyclic polycarboxylic acids, such as tetrahydrophthalic acid, hexahydrophthalic acid and methylhexahydrophthalic acid; polyester resins having two or more carboxyl groups in the molecule, acrylic resins, polybutadiene resins modified with maleic acid and fluororesins containing polyfluoro (alkyl or alkylene) groups; and silicone oils containing carboxyl groups, such as X-22-162A® and X-22-162C® (a product of Shin-Etsu Chemical Co., Ltd).

The compound having two or more carboxyl groups in the molecule is prepared by: (1) half-esterification of a polyol having two or more, preferably 2 to 50, hydroxyl groups in the molecule and an acid anhydride; (2) addition of a polyisocyanate compound having two or more, preferably 2 to 50 isocyanate groups in the molecule with a hydroxycarboxylic acid or an amino acid; (3) homopolymerization of an α,β-unsaturated monomer having a carboxyl group or copolymerization of the α,β-unsaturated monomer with other α,β-unsaturated monomers; (4) preparation of polyester resin having end carboxyl groups.

The compound of ingredient (A) may be a fluorine-containing compound. Fluorine-containing compounds introducing a fluorine atom in the compound obtained by the methods (1) to (4) described above also can be used as the compound having two or more carboxyl groups in the molecule.

Examples of the polyol having two or more hydroxyl groups include: polyhydric alcohols such as ethylene glycol, 1,2-propylene glycol, 1,3-propylene glycol, 1,3-butanediol, 1,4-butanediol, 2,3-butanediol, 1,6-hexanediol, diethylene glycol, pentanediol, dimethylbutanediol, hydrogenated bisphenol A, glycerol, sorbitol, neopentyl glycol, 1,8-octanediol, 1,4-cyclohexanedimethanol, 2-methyl-1,3-propanediol, 1,2,6-hexanetriol, 1,2,4-butanetriol, trimethylolethane, trimethylolpropane, pentaerythritol, quinitol, mannitol, tris-hydroxyethyl isocyanurate and dipentaerythritol; addition products of the polyhydric alcohols with a lactone, such as γ-butyrolactone and ε-caprolactone, by ring opening of the lactone; addition products of the polyhydric alcohol with an isocyanate, such as tolylene diisocyanate, diphenylmethane diisocyanate, hexamethylene diisocyanate and isophorone diisocyanate, in excess amount of the alcohol; addition products of the polyhydric alcohols with a divinyl ether, such as ethylene glycol divinyl ether, polyethylene glycol divinyl ether, butanediol divinyl ether, pentanediol divinyl ether, hexanediol divinyl ether and 1,4-cyclohexanedimethanol divinyl ether, in excess amount of the alcohol; condensation products of the polyhydric alcohol with an alkoxysilicone compound, such as KR-213®, KR-217®, KR-9218® (products of Shin-Etsu Chemical Co., Ltd.), in excess amount of the alcohol; and silicone oils containing hydroxyl groups, such as X-22-160AS® and KF-6001® (a product of Shin-Etsu Chemical Co., Ltd).

Fluorine-containing compounds introducing a fluorine atom in the polyol include, for example, polyols prepared by copolymerizing a hydroxyl group-containing vinyl ether and a fluorine-containing α,β-unsaturated monomer, and optionally other α,β-unsaturated monomer.

The hydroxyl group-containing vinyl ether include, for example, various hydroxy vinyl ether such as hydroxymethyl vinyl ether, hydroxyehtyl vinyl ether, hydroxypropyl vinyl ether, hydroxybutyl vinyl ether, hydroxypentyl vinyl ether, hydroxyhexyl vinyl ether, hydroxyheptyl vinyl ether, hydroxycyclohexyl vinyl ether.

The fluorine-containing α,β-unsaturated monomer includes, for example, $CF_2=CF_2$, $CHF=CF_2$, $CH_2=CF_2$, $CH_2=CHF$, $CClF=CF_2$, $CHCl=CF_2$, $CCl_2=CF_2$, $CClF=CClF$, $CHF=CCl_2$, $CH_2=CClF$, $CCl_2=CClF$, $CF_3CF=CF_2$, $CF_3CF=CHF$, $CF_3CH=CF_2$, $CF_3CF=CH_2$, $CHF_2CF=CHF$, $CH_3CF=CF_2$, $CH_3CF=CH_2$, $CF_2ClCF=CF_2$, $CF_3CCl=CF_2$, $CF_3CF=CFCl$, $CF_2ClCCl=CF_2$, $CF_2ClCF=CFCl$, $CFCl_2CF=CF_2$, $CF_3CCl=CClF$, $CF_3CCl=CCl_2$, $CClF_2CF=CCl_2$, $CCl_3CF=CF_2$, $CF_2ClCCl=CCl_2$, $CFCl_2CCl=CCl_2$, $CF_3CF=CHCl$, $CClF_2CF=CHCl$, $CF_3CCl=CHCl$, $CHF_2CCl=CCl_2$, $CF_2ClCH=CCl_2$, $CF_2ClCCl=CHCl$, $CCl_3CF=CHCl$, $CF_2ClCF=CF_2$, $CF_2BrCH=CF_2$, $CF_3CBr=CHBr$, $CF_2ClCBr=CH_2$, $CH_2BrCF=CCl_2$, $CF_3CBr=CH_2$, $CF_3CH=CHBr$, $CF_2BrCH=CHF$, $CF_2BrCF=CF_2$, $CF_3CF_2CF=CF_2$, $CF_3CF=CFCF_3$, $CF_3CH=CFCF_3$, $CF_2=CFCF_2CHF_2$, $CF_3CF_2CF=CH_2$, $CF_3CH=CHCF_3$, $CF_2=CFCF_2CH_3$, $CF_2=CFCH_2CH_3$, $CF_3CH_2CH=CH_2$, $CF_3CH=CHCH_3$, $CF_2=CHCH_2CH_3$, $CH_3CF_2CH=CH_2$, $CFH_2CH=CHCFH_2$, $CH_3CF_2CH=CH_2$, $CH_2=CFCH_2CH_3$, $CF_3(CF_2)_2CF=CF_2$, $CF_3(CF_2)_3CF=CF_2$, or $CH_2=C(CH_3)COOC_2H_4C_4F_9$, $CH_2=C(CH_3)COOC_2H_4(CF_2)_6CF(CF_3)_3$, $CH_2=C(CH_3)COOC_2H_4C_8F_{17}$, $CH_2=C(CH_3)COOC_2H_4C_{10}F_2$.

The other α,β-unsaturated monomer include, for example, olefins such as ethylene, propylene, butylene, isoprene and chloroprene; vinyl ethers and aryl ethers such as ethyl vinyl ether, propyl vinyl ether, isopropyl vinyl ether, butyl vinyl ether, t-butyl vinyl ehter, pentyl vinyl ether, hexyl vinyl ether, isohexyl vinyl ether, cyclohexyl vinyl ether, octyl vinyl ether, 4-methyl-1-pentyl vinyl ether, cyclopentyl vinyl ether, phenyl vinyl ether, o-, m- and p-tolyl vinyl ethers, benzyl vinyl ether and phenethyl vinyl ether; vinyl esters and propenyl esters such as vinyl acetate, vinyl lactate, vinyl butyrate, vinyl isobutyrate, vinyl caproate, vinyl isocaproate, vinyl pivalate, vinyl caprate, isopropenyl acetate and isopropenyl propionate; and methyl (meth) acrylate, ethyl (meth) acrylate, n-propyl (meth) acrylate, isopropyl (meth) acrylate, n-butyl (meth) acrylate, isobutyl (meth) acrylate, sec-butyl (meth) acrylate, hexyl (meth) acrylate, cyclohexyl (meth) acrylate, 2-ethylhexyl (meth) acrylate, octyl (meth) acrylate, stearyl (meth) acrylate, methoxybutyl (meth) acrylate, methoxyethyl (meth) acrylate, ethoxybutyl (meth) acrylate, ethoxyethyl (meth) acrylate, styrene, α-methylstyrene, p-vinyltoluene, p-chlorostyrene, acrylonitrile and methacrylonitrile.

Examples of the acid anhydride which reacts with the polyol include: acid anhydrides of polycarboxylic acids, such as succinic acid, glutaric acid, adipic acid, azelaic acid, sebacic acid, decamethylenedicarboxylic acid, phthalic acid, maleic acid, trimellitic acid, pyromellitic acid, tetrahydrophthalic acid, hexahydrophthalic acid and methyl hexahydrophthalic acid.

Examples of the polyisocyanate compound having two or more isocyanate groups in the molecule include: p-phenylene diisocyanate, biphenyl diisocyanate, tolylene diisocyanate, 3,3'-dimethyl-4,4'-biphenylene diisocyanate, 1,4-tetramethylene diisocyanate, hexamethylene diisocyanate, 2,2,4-trimethylhexane-1,6-diisocyanate, methylene-bis-(phenyl isocyanate), lysine methyl ester diisocyanate, bis-(isocyanatoethyl) fumarate, isophorone diisocyanate, methylcyclohexyldiisocyanate, 2-isocyanatoethyl-2,6-diisocyanatohexanoate, biuret derivatives of these polyisocyanates, and isocyanurate drivatives of these polyisocyanates.

Examples of the hydroxycarboxylic acid which reacts with the polyisocyanate compound include: lactic acid, citric acid, hydroxypivalic acid, 12-hydroxystearic acid and malic acid. Examples of the amino acid which reacts with the polyisocyanate compound include: DL-alanine, L-glutamic acid, glycine, L-teanine, glycylglycine, γ-aminocaproic acid, L-aspartic acid, L-citrulline, L-arginine, L-leucine and L-serine.

Examples of the carboxyl group-containing α,β-unsaturated monomer include acrylic acid, methacrylic acid, itaconic acid, mesaconic acid, maleic acid and fumaric acid. Examples of the other α,β-unsaturated monomer include the same as described above and fluorine-containing α,β-unsaturated monomers such as 2,2,2-trifluoromethylacrylate and 2,2,2-trifluoromethylmethacrylate.

Examples of the fluorine-containing polymer introducing a fluorine atom in the homopolymer of the carboxyl group-containing α,β-unsaturated monomer or the copolymer of the carboxyl group-containing α,β-unsaturated monomer and other α,β-unsaturated monomer include a copolymer prepared by copolymerizing a carboxyl group-containing α,β-unsaturated monomer and a fluorine-containing α,β-unsaturated monomer, and a copolymer prepared by copolymerizing a carboxyl group-containing α,β-unsaturated monomer, a fluorine-containing α,β-unsaturated monomer and other α,β-unsaturated monomer.

The carboxyl group-containing α,β-unsaturated monomer, the fluorine-containing α,β-unsaturated monomer and the other α,β-unsaturated monomer include the same as described above.

The polyester resin having end carboxyl groups can be easily prepared according to the conventional preparation method of polyester resins in excess amount of the polybasic acid to the amount of the polyhydric alcohol.

The reaction of such compound having two or more carboxyl group in the molecule with the compound having the formula (3) is generally performed at a temperature between room temperature and 100° C. in the presence of an acid catalyst.

Also, the compound of ingredient (A) can be prepared by homopolymerizing the reaction product of the carboxyl group-containing α,β-unsaturated monomer and the compound represented by formula (3) or by compolymerizing the reaction product and other α,β-unsaturated monomer.

Examples of the carboxyl group-containing α,β-unsaturated monomer include acrylic acid, methacrylic acid, itaconic acid, methaconic acid, maleic acid and fumaric acid. Examples of the other α,β-unsaturated monomer include methyl acrylate, ethyl acrylate, n-propyl acrylate, isopropyl acrylate, n-butyl acrylate, isobutyl acrylate, sec-butyl acrylate, cyclohexyl acrylate, 2-ethylhexyl acrylate, stearyl acrylate, methyl methacrylate, ethyl methacrylate, n-propyl methacrylate, isopropyl methacrylate, n-butyl methacrylate, isobutyl methacrylate, sec-butyl methacrylate, cyclohexyl methacrylate, 2-ethylhexyl methacrylate, stearyl methacrylate, styrene, α-methylstyrene, p-vinyltoluene and acrylonitrile, and further fluorine-containing α,β-unsaturated monomers such as 2,2,2-trifluoromethylacrylate and 2,2,2-trifluoromethylmethacrylate.

The compound of ingredient (A) may be utilized singly or in combination of two or more members in the thermosetting composition of the present invention.

The compounds utilized as ingredient (B) in the thermosetting composition of the invention are compounds having in the molecule two or more, preferably from 2 to 50, reactive functional groups which can form chemical bonds by the reaction with the regenerated carboxyl group formed from the blocked carboxyl group (1) of the compound (A) by heating. The kind of the reactive functional group is not particularly limited in the range that it has the properties described above. Preferable examples of the reactive functional group include an epoxy group, an oxazoline group, a silanol group, an alkoxysilane group, a hydroxyl group, an amino group, an imino group, an isocyanate group, a blocked isocyanate group, a cyclocarbonate group, a vinyl ether group, a vinyl thioether group, an aminomethylol group, an alkylated aminomethylol group, an acetal group and a ketal group. The reactive functional groups may include single kind or two or more members.

Examples of the compound of ingredient (B) include: compounds having epoxy group, such as epoxy resins of bisphenol type, alicyclic epoxy resins, homopolymers and copolymers of glycidyl acrylate, 3,4-epoxycyclohexylmethyl acrylate, glycidyl methacrylate, 3,4-epoxycyclohexylmethyl methacrylate, copolymers of glycidyl allyl ether, vinylidene fluoride and vinyl ether, polyglycidyl compounds obtained by the reaction of epichlorohydrine with polycarboxylic acids or polyols and other like compounds, silicone oils containing epoxy groups, such as KF-101®, KF-103®, KF-105®, X-22 -169AS® (a product of Shin-Etsu Chemical Co., Ltd); compounds having oxazoline group, such as oxazoline compounds having an oxazoline ring connected to an alkyl chain like 1,2-bis (2-oxazolinyl-2) ethane, 1,4-bis (2-oxazolinyl-2) butane, 1,6-bis (2-oxazolinyl-2) hexane, 1,8-bis (2-oxazolinyl-2) octane, 1,4-bis (2-oxazolinyl-2) cyclohexane, oxazoline compounds having two oxazoline rings connected to an aromatic ring like benzene ring like 1,2-bis (2-oxazolinyl-2) benzene, 1,3-bis (2-oxazolinyl-2) benzene, 1,4-bis (2-oxazolinyl-2) benzene, 5,5'-dimethyl-2, 2'-bis (2-oxazolinyl-2) benzene, 4,4,4',4'-tetramethyl-2,2'-bis (2-oxazolinyl-2) benzene, 1,2-bis (5-methyl-2-oxazolinyl-2) benzene, 1,3-bis (5-methyl-2-oxazolinyl-2) benzene, 1,4-bis (5-methyl-2-oxazolinyl-2) benzene, bis (2-oxazoline) compounds such as 2,2-bis (2-oxazoline), 2,2'-bis (4-methyl-2-oxazoline), 2,2'-bis (5-methyl-2-oxazoline) and the like, polyfunctional oxazoline compounds obtained by the reaction of hydroxyalkyl-2-oxazoline with the polyisocyanate compounds described above, compounds having oxazoline group like polymers and copolymers of 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline, commercial compounds having oxazoline group like CX-RS-1200®, CX-RS-3200® (products of Nippon Shokubai Co., Ltd.) and the like other compounds having oxazoline group; compounds having silanol group or alkoxysilane group, such as condensation products of a compound having the formula (4):

$$(R^9)_m \, Si \, (OR^{10})_{4-m} \quad (4)$$

wherein $R^9$ and $R^{10}$ are each selected from the group consisting of alkyl group of 1 to 18 carbon atoms and aryl group of 1 to 18 carbon atoms and m is 0, 1 or 2, homopolymers and copolymers of α,β-unsaturated silane compounds, like acryloyloxypropyltrimethoxy silane, methacryloyloxypropyltrimethoxysilane, methacryloyloxypropyltri-n-butoxysilane, compounds having silanol group or alkoxysilane group such as hydrolysis products of these compounds; compounds having hydroxyl group, such as aliphatic polyols, phenols, polyalkyleneoxyglycols, homopolymers and copolymers of α,β-unsaturated compounds, like 2-hydroxyethylacrylates, 2-hydroxypropyl acrylate, 2-hydroxyethyl methacrylates, 2-hydroxypropyl methacrylate, addition products of ε-caprolactone with these polyhydroxyl compounds; compounds having amino group, such as aliphatic diamino compounds, aromatic diamino compounds, polyamino compounds, polyamino compounds prepared by cyanoethylation and reduction of the compounds having hydroxyl group; compounds having imino group, such as aliphatic polyimino compounds, aromatic polyimino compounds; compounds having isocyanate group, such as p-phenylene diisocyanate, biphenyl diisocyanate, tolylene diisocyanate, 3,3'-dimethyl-4,4'-biphenylene diisocyanate, 1,4-tetramethylene diisocyanate, hexamethylene diisocyanate, 2,2,4-trimethylhexane-1,6-diisocyanate, methylene-bis (phenyl isocyanate), lysine methyl ester diisocyanate, bis-(isocyanatoethyl) fumarate, isophorone diisocyanate, methylcyclohexyl diisocyanate, 2-isocyanatoethyl 2,6-diisocyanatehexanoate, biuret derivatives and isocyanurate derivatives of these isocyanates, addition products of these isocyanates and the compounds having hydroxyl group; compounds having blocked isocyanate group, such as compound prepared by blocking the compounds having isocyanate group with phenols, lactams, active methylenes, alcohols, acid amides, imides, amines, imidazoles, ureas, imines, or oximes; compounds having cyclocarbonate group, such as homopolymers and copolymers of 3-acryloyloxypropylene carbonate or 3-methacryloyloxypropylene carbonate, compounds having polyfunctional cyclocarbonate groups prepared by the reaction of the compounds having epoxy group with carbon dioxide; compounds having vinyl ether group or vinyl thioether group, such as polyfunctional vinyl ether compounds prepared by the reaction of the compounds having polyfunctional hydroxyl group with halogenated alkyl vinyl ethers, polyvinyl ethers prepared by the reaction of hydroxyalkyl vinyl ethers with compounds having the polyfunctional carboxyl group or with the compounds having isocyanate group, copolymer of vinyloxyalkyl acrylates or vinyloxyalkyl methacrylates with α,β-unsaturated compounds, or vinyl thioethers corresponding to the vinyl ethers; compounds having aminomethylol groups or alkylated aminomethylol groups, such as melamine formaldehyde resins, glycolyl formaldehyde resins, urea formaldehyde resins, homopolymers and copolymers of α,β-unsaturated compounds having aminomethylol group or alkylated aminomethylol group; acetal group-containing compounds or ketal group-containing compounds, such as polyfunctional acetal compounds prepared by the reaction of polyfunctional ketones, polyfunctional aldehydes, or the polyfunctional vinyl ether compounds described above with alcohols or orthoacids esters, condensation products of the polyfunctional acetal compounds with polyols, homopolymers and copolymers of addition products of the vinyloxyalkyl acrylate or vinyloxyalkyl methacrylate with alcohols or orthoacid esters.

Suitable examples of $R^9$ and $R^{10}$ in the formula (4) include the same as the examples of $R^1$ of the formula (1).

Fluorine-containing comopounds introducing a fluorine atom can be used as the comound of ingredient (B).

The fluorine-containing comopounds of ingredient (B) include, for example, a compolymer of the α,β-unsaturated monomer having the reactive functional group and the fluorine-containing α,β-unsaturated monomer, and optionally other α,β-unsaturated monomer.

As examples of the α,β-unsaturated monomer having the reactive functional group, examples of the α,β-unsaturated monomer having an epoxy group include p-glycidyloxy styrene, p-glycidyloxy-α-methyl styrene, p-(3,4-epoxycyclohexylmethyloxy) styrene, p-(3,4-epoxycyclohexylmethyloxy)-α-methyl styrene, glycidyl ethylene, 3,4-epoxycyclohexylmethyl ethylene, glycidyl vinyl ether, 3, 4-epoxycyclohexylmethyl vinyl ether, glycidyl allyl ether and 3,4-epoxycyclohexylmethyl allyl ether. Examples of the α,β-unsaturated monomer having an alkoxysilane group include vinyltrimethoxysilane, allyltrimethoxysilane, trimethoxysilyl vinyl ether, trimethoxysilyl allyl ether, p-trimethoxysilyl styrene, p-methoxysilyl-α-methylstyrene, p-trimethoxysilyloxy styrene and p-trimethoxysilyloxy-α-methylstyrene. Examples of the α,β-unsaturated monomer having a hydroxyl group include hydroxyethyl vinyl ether, hydroxypropyl vinyl ether, hydroxybutyl vinyl ether, hydroxycyclohexyl vinyl ether, hydroxyethyl allyl ether, hydroxypropyl allyl ether and hydroxybutyl allyl ether. Examples of the α,β-unsaturated monomer having an acetal group include acetal compounds of 1 mol of ethylene glycol divinyl ether and 1 mol of monatomic alcohols such as methanol, ethanol, propanol and butanol, acetal compounds of 1 mol of polyethylene glycol divinyl ether and 1 mol of the monatomic alcohols, and acetal compounds of 1 mol of cyclohexanedimethanol divinyl ether and 1 mol of the monatomic alcohols.

Examples of the other α,β-unsaturated monomer include the same as described above.

The compound (B) utilized in the invention may be either a compound comprising a single kind of functional group, such as the compounds shown in the examples, or a compound comprising two or more kind of functional group in the molecule. Two or more members of the compound (B) may utilized together. However, when the functional groups of two or more members are reactive between each other, the storage stability of the thermosetting composition is damaged and the utilization of such combination of the functional groups is undesirable. Examples of such undesirable combination of functional groups are: combination of a functional group selected from the group of epoxy group, isocyanate group, vinyl ether group, vinyl thioether group, cyclocarbonate group and silanol group with amino group or imino group, combination of hydroxyl group with isocyanate group or vinyl ether group and the like other combinations.

In the thermosetting composition of the present invention, a dispersing component of at least one inorganic oxide sol selected from the group consisting of an aluminum oxide sol, a silica sol, a zirconium oxide sol and an antimony oxide sol can be utilized as a ceramic ingredient of ingredient (C). A preferable inorganic oxide sol is a silica sol.

Many of the inorganic oxide sols are generally supplied as aqueous dispersing system. In the case of the aqueous dispersing system, when the coating composition is water-borne system, the dispersing system can be utilized as it is. When the coating composition is a solution system of an organic solvent, the methods such as a phase conversion into the organic solvent can be utilized. Preferable organic solvents include ketone solvents such as methylisobutylketone and cyclohexanone.

The method of phase conversion into the organic solvent includes the method that a water-soluble organic solvent is added into the aqueous dispersing component and a operation of distillation and removal of water is repeated to proceed the phase conversion into the desired organic solvent.

The dispersing component of a silica sol can be produced by adding silicon tetrahalide into water, by adding acid into aqueous sodium silicate solution and the like. Examples of commercial aqueous dispersing components are SNOWTEX-O (trade name, a product of Nissan Chemical Industries, Ltd.) and SNOWTEX-N (trade name, a product of Nissan Chemical Industries, Ltd.). Examples of commercial organic solvent dispersing components are SNOWTEX-MIBK-ST (trade name, a product of Nissan Chemical Industries Co. Ltd.) and SNOWTEX-MIBK-SZ (trade name, a product of Nissan Chemical Industries Co. Ltd.).

The dispersing component of an inorganic oxide sol is preferably a dispersing component of an inorganic oxide sol surface-treated with a silane coupling agent, more preferably a dispersing component of silica sol surface-treated with a silane coupling agent. The surface-treated dispersing component of an inorganic oxide sol can introduce various functional groups on the surface of the particles. Therefore, when the surface-treated dispersing component is used in the thermosetting composition of the present invention, the surface-treated dispersing component easily bonds with organic components such as the resin, the polyisocyanate compound or the aminoplast resin. In such case that the ceramic ingredient chemically bonds with the organic component, the crosslinking of the paint film is tighter than that without chemical bonds and the stain resistance, stain-removing property and weathering resistance are improved.

The silane coupling agents include vinyltrimethoxysilane, vinyltriethoxysilane, γ-methacryloyloxypropyltrimethoxysilane, γ-glycidoxypropyltrimethoxysilane, γ-aminopropyltrimethoxysilane, methyltrimethoxysilane, methyltriethoxysilane and dimethyldimethoxysilane. The silane coupling agent is preferably methyltrimethoxysilane, dimethyldimethoxysilane, γ-glycidoxypropyltrimethoxysilane and γ-methacryloyloxypropyltrimethoxysilane, more preferably methyltrimethoxysilane and dimethyldimethoxysilane. Examples of commercial silane coupling agents are A-162, A-163 and AZ-6122 (each trade name, a product of NIPPON UNICAR CO., L.T.D.). The silane coupling agents may be utilized singly or in combination of two or more members. When the dispersing component of the inorganic oxide sol is surface-treated with the silane coupling agent, the amount of the silane coupling agent is preferably 1 to 40 percent by weight, more preferably 5 to 30 percent by weight based on the amount of nonvolatile matter of the inorganic oxide sol.

The dispersing component of the inorganic oxide sol surface-treated with the silane coupling agent is preferably a dispersing component of the inorganic oxide sol dispersed in the azeotropic solvent produced by dehydrating water containing in an aqueous inorganic oxide sol by azeotropic distillation with an azeotropic solvent to water and then surface-treating the dispersing component with the silane coupling agent. More preferably, the dispersing component of the inorganic oxide sol is a dispersing component of the silica sol. The dispersing component of the inorganic oxide sol produced by the method improves the stain resistance, stain-removing property and weathering resistance of the obtained paint film. Further, a coating composition having high nonvolatile matter can be easily obtained by preparing the coating composition because it is possible to increase the concentration of the inorganic oxide sol. Therefore, it is possible to select a thinner for controlling the viscosity of the coating composition from various thinners in broad selection width and to increase the thickness of the paint film in coating.

The azeotropic solvents include a water-soluble alcohol, a water-soluble carboxylic acid ester and a water-soluble cyclic ether.

The water-soluble alcohols include ethanol, n-propylalcohol, i-propylalcohol, n-butylalcohol, i-butylalcohol, sec-butylalcohol, t-butylalcohol, methylcellosolve, ethylcellosolve, ethyleneglycolmonomethylether, ethyleneglycolmonoethylether, ethyleneglycolmono-n-propylether, ethyleneglycolmonobutylether, diethyleneglycolmonomethylether, diethyleneglycolmonoethylether, diethyleneglycolmonobutylether, 3-methyl-3-methoxybutanol, propyleneglycolmonomethylether, ethyleneglycol and propyleneglycol.

The water-soluble carboxylic acid esters include methylacetate and ethylacetate. The water-soluble cyclic ethers include 1,4-dioxane.

The azeotropic solvents may be utilized singly or in combination of two or more members.

A water-insoluble solvent also can be used together with a mediation of the water-soluble solvent in order to improve the efficiency of dehydration by azeotropic distillation. The water-insoluble solvents include benzene, xylene, toluene, cyclohexanone, diphenylether and dibutylether. The water-insoluble solvent may be utilized singly or in combination of two or more members. The amount of the water-insoluble solvent is limited in the range in which the sol is not flocculated and generally preferably 1 to 10 percent by weight, though the amount is different according to the kind of the water-insoluble solvents.

The dehydration by azeotropic distillation is preferably proceeded with the dropping of azeotropic solvent. The dehydration by azeotropic distillation is proceeded in the range of preferably 30 to 100° C., more preferably 40 to 80° C. The dehydration by azeotropic distillation can be proceeded under reduced pressure or atmosphere, preferably under reduced pressure. The water content of the inorganic oxide sol dispersed in the azeotropic solvent after the dehydration by azeotropic distillation is generally preferably not more than 2 percent by weight, more preferably not more than 1 percent by weight. The concentration of the dispersing component of the inorganic oxide sol dispersed in the azeotropic solvent after dehydration by azeotropic distillation is preferably not more than 55 percent by weight, more preferably 25 to 55 percent by weight as nonvolatile content.

The surface-treatment with the silane coupling agent can be proceeded by mixing the silane coupling agent with the dispersing component of the inorganic oxide sol dispersed in the azeotropic solvent after the dehydration by azeotropic distillation. The temperature of surface-treatment with the silane coupling agent is particularly not limited, preferably 20 to 100° C., more preferably 30 to 90° C., furthermore 40 to 80° C.

The water content of the inorganic oxide sol dispersed in the azeotropic solvent after the surface-treatment with the silane coupling agent is generally preferably not more than 1 percent by weight, more preferably not more than 0.5 percent by weight.

The solvent of inorganic oxide sol dispersed in the azeotropic solvent can be substituted with the desired solvent according to the need. The solvents used in solvent substitution include an alcohol described above, acetone, methylethylketone, methylisobutylketone, cyclohexanone, dimethylacetoamide and dimethylformamide. The solvent substitution is proceeded in the range of preferably 30 to 120° C., more preferably 40 to 110° C., though it is influenced by the kind of the solvents.

The average particle diameter of the dispersing component of inorganic oxide sol is preferably not more than 100 nm, more preferably not more than 50 nm. The lower bound of the average particle diameter is not limited in the range of formation of the inorganic sol, and preferably 5 or more nm.

When the average particle diameter is more than 100 nm, transparency of a clear film decreases and the stain resistance and stain removing property of the paint film decreases.

In the thermosetting composition of the present invention, the dispersing components of inorganic oxide sol may be utilized singly or in combination of two or more members. The amount of the dispersing component of inoriganic oxide sol is selected to be 0.1 to 60 percent by weight of the nonvolatile matter of the dispersing component of inorganic oxide sol based on the total amount of nonvolatile matter of ingredient (A) and ingredient (B) or ingredient (E) and optionally ingredient (A) and/or ingredient (B). When the amount of the nonvolatile matter of the dispersing component of inorganic oxide sol is less than 0.1 percent by weight to the total amount of nonvolatile matter, the effect of addition of the dispersing component of inorganic oxide sol is not sufficiently obtained and the improvement effect of the stain resistance, stain-removing property and weathering resistance of the paint film is not sufficiently obtained. When the amount of the nonvolatile matter of the dispersing component of inorganic oxide sol is more than 60 percent by weight to the total amount of nonvolatile matter, the trend of the decrease in the flexibility of the paint film is observed. The amount of the nonvolatile matter of the dispersing component of inorganic oxide sol is preferably 1 to 40 percent by weight against the total amount of nonvolatile matter in view of the balance of stain resistance, stain-removing property, weathering resistance, and flexibility of the paint film.

The thermosetting composition of the invention may comprise the compound of ingredient (A), the compound of ingredient (B) and the dispersing component of an inorganic oxide sol of ingredient (C) or it may comprise essentially the dispersing component of an inorganic oxide sol of ingredients (C) and (E) being a self-crosslinkable compound comprising ($\alpha$) one or more, preferably from 1 to 50, functional group having the formula (2):

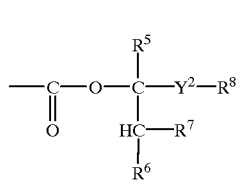

(2)

wherein $R^5$, $R^6$, $R^7$, $R^8$ and $Y^2$ have the same meaning as described above, and ($\beta$) one or more, preferably from 1 to 50, reactive functional groups which can form chemical bond with the functional group ($\alpha$), and optionally the compound of ingredient (A) and/or the compound of ingredient (B) and/or the compound of ingredient (D). In this case, the functional group of the compound (B) forms chemical bond with the functional group of formula (1) and/or the functional group of formula (2) by heating.

Examples of the functional group ($\alpha$) having the formula (2) of the compound of ingredient (E) are the same functional groups as the examples of the functional group having the formula (1) in ingredient (A) described above. Examples of the reactive functional group ($\beta$) are the same functional groups as the examples of the reactive functional groups of compound of ingredient (B).

The compound of ingredient (E) can be prepared from a compound comprising one or more, preferably from 1 to 50, carboxyl groups and one or more, preferably from 1 to 50, reactive functional groups in the molecule by using the same as the method utilized in the preparation of the compound of ingredient (A). The compound of ingredient (E) can also be prepared by copolymerization of an unsaturated compound having the functional group of formula (2) with an unsaturated compound having the reactive functional group described above.

The compound of ingredient (E) comprises the functional group of formula (2) and, furthermore, may comprise two or more members of the reactive functional groups in the same molecule. However, when the two or more members of the functional groups are active between each other, the storage stability of the thermosetting composition is reduced as shown in the case of the compound of ingredient (B). Accordingly, the utilization of such combination of the functional groups is undesirable.

In the thermosetting composition of the invention, it is preferable that at least one of ingredient (A) and/or ingredient (B), or at least one of ingredient (E) and optionally ingredient (A) and/or ingredient (B) is a polymer of an α,β-unsaturated compound or a polyester resin. It is also preferable that equivalent ratio of the functional group of the formula (1) or the formula (2) and the reactive functional group to form chemical bond with the former functional group utilized in the thermosetting composition is adjusted in the range from 0.2:1.0 to 1.0:0.2.

The functional groups having the formula (1) and the formula (2) in ingredient (A) and ingredient (E) of the invention regenerate free carboxyl group by heating and form chemical linkages with the reactive functional groups in ingredient (B) and ingredient (E). As active ester based on internal polarization structure, the functional groups of ingredient (A) can also react with the functional groups in ingredient (B) and ingredient (E) by addition and this addition reactions can contribute to decreasing amount of volatile organic substances discharged into air because the addition reactions are not accompanied with elimination reactions during the crosslinking.

In the present invention, the thermal latent acid catalyst of ingredient (D) which shows activity in the curing condition at an elevated temperature can be optionally comprised in the thermosetting composition for the purpose of keeping excellent storage stability of the composition for a long period of time, promoting the curing reaction when the composition is cured in a short time at a rather low temperature and giving excellent chemical properties, and physical properties to the cured products.

The thermal latent acid catalysts of ingredient (D) are desirably a compounds which show acid catalyst activity at the temperatures of 60° C. or above. When the thermal latent acid catalyst shows acid catalyst activity at the temperatures of less than 60° C., the obtained composition may be in danger of causing undesirable situations such as the increase of viscosity and the gelation during storage.

More preferable examples of the thermal latent acid catalyst of ingredient (D) are compounds prepared by neutralizing Bronsted acids with Lewis bases, compounds prepared by neutralizing Lewis acids with Lewis bases, mixtures of Lewis acids and trialkyl phosphate, esters of sulfonic acids, esters of phosphoric acid, onium compounds, compounds comprising (i) a epoxy group-containing compound, (ii) a sulfur atom-containing compound and (iii) a Lewis acid, or these compounds and (iv) a carboxyl compound and/or a carboxylic acid anhydride compound.

The compounds prepared by neutralizing Bronsted acids with Lewis bases include, for example, compounds prepared by neutralizing halogenocarboxylic acids, sulfonic acids, monoesters of sulfuric acid, monoesters and diesters of phosphoric acid, esters of polyphosphoric acid, or monoesters and diesters of boric acid with amines, such as ammonia, monoethylamine, triethylamine, pyridine, piperidine, aniline, morpholine, cyclohexylamine, n-butylamine, monoethanol amine, diethanol amine and triethanol amine; with trialkylphosphine, triarylphosphine, trialkylphosphite, or triarylphosphite, and Nacure 2500X®, Nacure X-47-110®, Nacure 3525® and Nacure 5225® (products of King Industry Co., Ltd) as the commercial acid-base blocked catalysts.

The compounds prepared by neutralizing Lewis acids with Lewis bases include, for example, compounds prepared by neutralizing Lewis acids such as $BF_3$, $FeCl_3$, $SnCl_4$, $AlCl_3$ and $ZnCl_2$ with Lewis bases described above and mixtures of Lewis acids described above and trialkylphosphate, The esters of sulfonic acids are compounds having the formula (5):

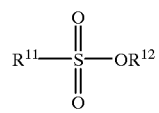

(5)

wherein $R^{11}$ is selected from the group consisting of phenyl group, substitued phenyl group, naphthyl group, substituted naphthyl group and alkyl group and $R^{12}$ is a group of 3 to 18 carbon atoms bonded with sulfonyloxy group through a primary or secondary carbon atom, which is selected from the group consisting of alkyl group, alkenyl group, aryl group, alkaryl group, alkanol group, saturated or unsaturated cycloalkyl group and saturated or unsaturated hydroxycycloalkyl group. Examples of the above mentioned compounds are esters of sulfonic acids such as methane sulfonic acid, ethane sulfonic acid, benzene sulfonic acid, dodecylbenzene sulfonic acid, naphthalene sulfonic acid and nonylnaphthalene sulfonic acid with primary alcohols such as n-propanol, n-butanol, n-hexanol and n-octanol, or secondary alcohols such as isopropanol, 2-butanol, 2-hexanol, 2-octanol and cyclohexanol, and β-hydroxyalkylsulfonic esters prepared by the reaction of the sulfonic acid and compounds containing oxirane group.

The esters of phosphoric acid are, for example, compounds having the formula (6)

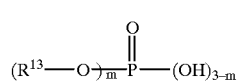

(6)

wherein $R^{13}$ is a group of 3 to 10 carbon atoms selected from the group consisting of alkyl group, cycloalkyl group and aryl group and m is 1 or 2. Examples of the above mentioned compounds are monoesters and diesters of phosphoric acid with primary alcohols such as n-propanol, n-butanol, n-hexanol, n-octanol and 2-ethylhexanol, or secondary alcohols such as isopropanol, 2-butanol, 2-hexanol, 2-octanol and cyclohexanol.

The onium compounds are, for example, compounds having one of the formulas (7) to (10):

  (7)

  (8)

  (9)

and $$(R^{14}_2SR^{15})^+X^- \qquad (10)$$

wherein $R^{14}$ is a group of 1 to 12 carbon atoms selected from the group consisting of alkyl group, alkenyl group, aryl group, alkaryl group, aklanol group and cycloalkyl group, two $R^{14}$ groups may be bonded together to form a heterocyclic ring in which N, P, O or S is the hetero atom, $R^{15}$ is a hydrogen atom or a group of 1 to 12 carbon atoms selected from the group consisting of alkyl group, alkenyl group, aryl group and alkaryl group and $X^-$ is selected from the group consisting of $SbF_6^-$, $AsF_6^-$, $PF_6^-$ and $BF_4^-$.

Suitable examples of the epoxy group-containing compound (i), which is used in the thermal latent acid catalyst comprising the epoxy group-containing compound (i), the sulfur atom-containing compound (ii) and the Lewis acid (iii), or component (i), (ii) and (iii) and the carboxylic acid compound and/or the carboxylic acid anhydride compound (iv), include aliphatic monoepoxide compounds derived from alkene such as propyleneoxide and butyleneoxide; alicyclic monoepoxide compounds derived cycloalkene such as cyclohexeneoxide, CELOXIDE2000® (a product of Daicel Chemical Industries Co., Ltd.), CELOXIDE3000® (a product of Daicel Chemical Industries Co., Ltd.), RIKARESIN E-8® (a product of New Japan Chemical Co., Ltd.), 3,4-epoxycyclohexyl methyl acrylate and 3,4-epoxycyclohexylmethyl methyacrylate; aromatic monoepoxide compounds having an aromatic ring such as styreneoxide and stilbeneoxide; glycidylether compounds such as methylglycidylether, ethylglycidylether, propylglycidylether, butylglycidylether, octylglycidylether, phenylglycidylether, allylglycidylether and polyalkyleneoxide monoglycidylether; glycidylester compounds such as glycidylisobutyrate, CARDURA E-10® (a product of Shell Co.), glycidylacrylate and glycidylmethacrylate; epoxy plasticizers such as SANSOCIZER E-4030® (a product of New Japan Chemical Co., Ltd.) and SANSOCIZER E-6000® (a product of New Japan Chemical Co., Ltd.); homopolymers of monomers such as glycidylacrylate, glycidylmethacrylate, allylglycidylether, 3,4-epoxycyclohexylmethyl acrylate and 3,4-epoxycyclohexylmethyl methacrylate or copolymers of the monomers and one or more of the other monomers; bisphenol type epoxy resin; and polymers having epoxy groups such as polyglycidyl compounds obtained by reacting polycarboxylic acids with epichlorohydrin or polyols with epichlorohydrin. Preferable examples are propyleneoxide, butyleneoxide, SANSOCIZER E-4030® (a product of New Japan Chemical Co., Ltd.), SANSOCIZER E-6000® (a product of New Japan Chemical Co., Ltd.), RIKARESIN E-8® (a product of New Japan Chemical Co., Ltd.), cyclohexeneoxide, CELOXIDE3000® (a product of Daicel Chemical Industries Co., Ltd.), methylglycidylether, ethylglycidylether, propylglycidylether, butylglycidylether, CARDURA E-10® (a product of Shell Co.), homopolymers of glycidylacrylate, glycidylmethacrylate, allylglycidylether, 3,4-epoxycyclohexylmethylacrylate and 3,4-epoxycyclohexylmethyl methacrylate or copolymers of the monomers and one or more of the other monomers.

When the epoxy group-containing compound is a polymer, the content of the epoxy groups is preferably in the range from 0.1 to 7 mol/kg, more preferably 0.35 to 5 mol/kg.

Either a single kind of the epoxy group-containing compound or a combination of two or more members of the epoxy group-containing compound may be utilized.

Suitable examples of sulfur atom-containing compound (ii), which is used in the thermal latent acid catalyst, include alkyl sulfides such as dimethyl sulfide, diethyl sulfide, di-n-propyl sulfide, di-n-butyl sulfide, di-n-hexyl sulfide, diisopropyl sulfide, di-sec-butyl sulfide, di-tert-butyl sulfide, di-n-octyl sulfide and di-2-ethylhexyl sulfide; hydroxyalkyl sulfides or the derivates such as 2-(ethylthio) ethanol, 2,2'-thiodiethanol and bis (2-methoxyethyl) sulfide; sulfur atom-containing compounds having an aromatic ring such as diphenyl sulfide and thioanisole; sulfur atom-containing compounds having a carboxylic acid ester portion such as methyl methylthioacetate, ethyl methylthiopropionate and dimethyl thiodipropionate; sulfur atom-containing compounds having a nitrile group such as thiodipropionitrile; cyclic sulfur atom-containing compounds such as tetrahydrothiophene, tetrahydrothiapyran, 1,2-oxathiorane, 1,3-oxathiorane and 1,3-oxathiane, 1,4-oxathiane. Preferable examples of sulfur atom-containing compound (ii) are alkyl sulfides such as di-n-propyl sulfide, di-n-butyl sulfide, di-n-hexyl sulfide, di-isopropyl sulfide, di-sec-butyl sulfide, di-tert-butyl sulfide, di-n-octyl sulfide, di-2-ethylhexyl sulfide; and 2-(ethylthio) ethanol, bis (2-methoxyethyl) sulfide, methyl methylthioacetate, ethyl methylthiopropionate, tetrahydrothiophene and 1,4-oxathiane.

Either a single kind of the sulfur atom-containing compound (ii) or a combination of two or more members of the sulfur atom-containing compound (ii) may be utilized.

Suitable examples of the Lewis acid (iii), which is used in the thermal latent acid catalyst, are: metal halides, such as boron trifluoride, aluminium trichloride, titanium trichloride, titanium tetrachloride, ferrous chloride, ferric chloride, zinc chloride, zinc bromide, stannous chloride, stannic chloride, stannous bromide and stannic bromide; organometallic compounds, such as trialkylboron, trialkylaluminium, dialkylaluminium halides, monoalkylalminium halides and tetraalkyltin; metallic chelate compounds such as diisopropoxyethylacetoacetate aluminium, tris (ethylacetoacetate) aluminium, isopropoxy bis (ethylacetoacetate) aluminium, monoacetylacetonato.bis (ethylacetoacetate) aluminium, tris (n-propylacetoacetate) aluminium, tris (n-butylacetoacetate) aluminium, monoethylacetoacetate.bis (acetylacetonato) aluminium, tris (acetylacetonato) aluminium, tris (propionylacetonato) aluminium, acetylacetonato.bis (propionylacetonato) aluminium, diisopropoxy.bis (ethylacetoacetate) titanium, diisopropoxy.bis (acetylacetonato) titanium, tetrakis (n-propylacetoacetate) zirconium, tetrakis (acetylacetonato) zirconium, tetrakis (ethylacetoacetate) zirconium, dichloro.bis (acetylacetonato) tin, dibutyl.bis (acetylacetonato) tin, tris (acetylacetonato) iron, tris (acetylacetonato) chromium, tris (acetylacetonato) rhodium, bis (acetylacetonato) zinc and tris (acetylacetonato) cobalt; metallic soaps such as dibutyltin dilaurate, dioctyltin ester maleate, magnesium naphthenate, calcium naphthenate, manganese naphthenate, iron naphthenate, cobalt naphthenate, copper naphthenate, zinc naphthenate, zirconium naphthenate, lead naphthenate, calcium octanoate, manganese octanoate, iron octanoate, cobalt octanoate, zinc octanoate, zirconium octanoate, tin octanoate, lead octanoate, zinc laurate, magnesium stearate, aluminium stearate, calcium stearate, cobalt stearate, zinc stearate and lead stearate. Further, when the carboxylic acid and/or the carboxylic acid anhydride compound are not used, more preferable examples of the Lewis acid are chelate compounds containing boron, aluminium, tin, titanium, zinc or zirconium, and metallic soaps, in view of solubility to an organic solvent.

The Lewis acid (iii) may be utilized singly or in combination of two or more members.

Suitable examples of the carboxylic acid (iv), which is used in the thermal latent acid catalyst, include monocarboxylic acid such as formic acid, acetic acid, propionic acid, butyric acid, 2-ethylhexanoic acid, lauric acid, stearic acid, oleic acid, linoleic acid, linolenic acid, acrylic acid, methacrylic acid, monochloroacetic acid, dichloroacetic acid and trichloroacetic acid; polycarboxylic acid such as succinic acid, glutaric acid, adipic acid, azeleic acid, sebacic acid, decamethylene dicarboxylic acid, phthalic acid, maleic acid, trimellitic acid, pyromellitic acid, tetrahydrophthalic acid, hexahyrophthalic acid, methyl hexahydrophthalic acid, itaconic acid, methaconic acid and fumaric acid; acrylic resins containing carboxyl groups and polyester resins containing carboxyl groups. Preferable examples of the carboxylic acid are monocarboxylic acids or polycarboxylic acids having lower molecular weight. More preferable examples of the carboxylic acid are monocarboxylic acids or polycarboxylic acids having molecular weight of not more than 3000.

Suitable examples of the carboxylic acid anhydride compound (iv), which is used in the thermal latent acid catalyst, include low molecular weight caboxylic anhydride such as acetic anhydride, propionic anhydride, butyric anhydride, isobutyric anhydride, lauric anhydride, oleic anhydride, linoleic anhydride, stearic anhydride, linolenic anhydride, succinic anhydride, phthalic anhydride, maleic anhydride, trimellitic anhydride, pyromellitic anhydride, isovaleric anhydride, n-caproic anhydride, n-caprylic anhydride, n-capric anhydride, citraconic anhydride, gultaric anhydride, itaconic anhydride, crorendic anhydride, palmitic anhydride, myristic anhydride, tetrapropenyl succinic anhydride, tetrahrydophthalic anhydride, hexahydrophthalic anhydride, 4-methylhexahydrophthalic anhydride, endomethylenetetrahydrophthalic anhydride, methylendomethylenetetrahydrophthalic anhydride, tetrachlorophthalic anhydride, 3-nitrophthalic anhydride, trichloroacetic anhydride, dichloroacetic anhydride, monochloroacetic anhydride, trifluoroacetic anhydride and heptafluorobutyric anhydride and polymers having carboxylic acid anhydride groups such as acrylic resins containing acid anhydride groups and polyester resins containing acid anhydride groups. Preferable examples of the carboxylic acid anhydride are acetic anhydride, propionic anhydride, butyric anhydride, isobutyric anhydride, lauric anhydride, oleic anhydride, stearic anhydride, n-caproic anhydride, n-caprylic anhydride, n-capric anhydride, palmitic anhydride, myristic anhydride, trichloroacetic anhydride, dichloroacetic anhydride, monochloroacetic anhydride, trifluoroacetic anhydride and heptafluorobutyric anhydride.

Increase of solubility to an organic solvent, which is effect of the carboxylic acid and/or the carboxylic acid anhydride compound, is remarkable, when the Lewis acid is the metal halide.

The carboxylic acid compound and the carboxylic acid anhydride compound (iv) may be utilized singly or in combination of two or more members.

The mixing ratio of the components in preparation of the thermal latent acid catalyst is not particularly limited. The equivalent ratio of the epoxy group of the epoxy group-containing compound (i) and the sulfur atom of the sulfur atom-containing compound (ii) to a boron atom, an aluminium atom, a tin atom, a lead atom or a transition element of the Lewis acid (iii) are each preferably in the range from 0.2 to 10, more preferably 0.5 to 5. When the equivalent ratio is less than 0.2, the activity of the Lewis acid may be sufficiently not inhibited in storage. When the equivalent ratio is more than 10, the activity of the Lewis acid may be inferior by heating.

The equivalent ratio of the carboxyl group of the carboxylic acid compound and/or the acid anhydride group of the carboxylic acid anhydride compound (iv) to a boron atom, an aluminium atom, a tin atom, a lead atom or a transition element of the Lewis acid (iii) is not particularly limited, but is preferably in the range from 0.05 to 10, more preferably 0.1 to 5. When the equivalent ratio is less than 0.05, the solubility to organic solvents acid may be not sufficient. When the equivalent ratio is more than 10, the activity of the Lewis acid may be sufficiently not inhibited in storage.

The thermal latent acid catalyst is easily prepared by mixing the epoxy group-containing compound (i), the sulfur atom-containing compound (ii) and the Lewis acid (iii) in the presence of a solvent or without a solvent in optional order. It is preferable that after the mixture of the epoxy group-containing compound (i) and the sulfur atom-containing compound (ii) is prepared, the thermal latent acid catalyst is prepared by mixing the Lewis acid (iii) into the mixture. Also, it is preferable that after the mixture of the sulfur atom-containing compound (ii) and the Lewis acid (iii) is prepared, the thermal latent acid catalyst is prepared by mixing the epoxy group-containing compound (i) into the mixture. The mixing order of the carboxylic acid compound and/or the carboxylic acid anhydride compound (iv) is optional. More preferable mixing order is at first mixing the epoxy group-containing compound (i), the sulfur atom-containing compound (ii) and the Lewis acid (iii), and then, mixing the carboxylic acid compound and/or the carboxylic acid anhydride compound (iv) into the mixture. In the preparation of the thermal latent acid catalyst, it is preferable to heat at temperature from room temperature to 100° C. for 10 minutes through 10 hours, after mixing two components or three components, or optionally four components or five components, because it may accelerate the thermal latent reaction.

Solvents utilized in the preparation of the thermal latent acid catalyst include aliphatic hydrocarbon solvents, aromatic hydrocarbon solvents, ether solvents, alcohol solvents, ester solvents, ketone solvents and the mixture. The amount of the solvent is selected according to needs, but it is generally preferable to control the thermal latent acid catalyst in the range from 1 to 90% by weight.

The thermal latent acid catalyst of ingredient (D) may be utilized singly or in combination of two or more members in the thermosetting composition of the present invention.

The formulation amount of the thermal latent acid catalyst is selected in the range from 0.01 to 20 parts by weight, preferably 0.02 to 10 parts by weight based on 100 parts by weight of the total nonvolatile matter of the sum of ingredient (A) and ingredient (B) or the sum of ingredient (E) and the optionally utilized ingredient (A) and/or ingredient (B).

When the amount of the thermal latent acid catalyst is less than 0.01 parts by weight, the promoting effect of the catalytic activity may be not sufficiently manifested. When the amount is more than 20 parts by weight, the promoting effect is lower than the value expected and the decrease in properties of the cured products may be caused by the presence of the catalyst in great quantities as residue in the cured product.

The time and temperature required to cure the thermosetting composition of the present invention is different depending on the temperature at which free carboxyl group is regenerated from the blocked functional group of the formula (1) or the formula (2), kind of the reactive functional group and the kind of the catalytic component. In general, curing is completed by heating at the temperatures in the range from 50 to 300° C. for the time in the range from 5 seconds to 24 hours.

The thermosetting composition may be formulated without other ingredients or with various additives such as coloring pigments, fillers, solvents, ultraviolet light absorbents, antioxidants and flow controlling agent, and can be utilized in various uses applying the curing ability such as coating compositions, ink, adhesives and molded articles.

The thermosetting composition is prepared by formulating the above mentioned ingredients and, according to needs, various additives. The addition method of the ingredients and the additives is not limited and is conducted by various methods and the mixing order and the addition order are also conducted by various methods.

The thermosetting composition of the present invention can be used as coating compositions which is utilized in the process for preparing articles having a single layer paint film of a top coat or multilayer paint films comprising a colored base coat film and a clear top coat film. The thermosetting composition of the present invention is very important in the fields of industrial coating such as coating compositions for automobile, railway vehicles, metal articles of precoat or postcoat, electric instruments, steel structures, machines and building materials, and further coating compositions for insulating, moistureproofing or rustproofing electron or electric parts and coating compositions in the other industrial coating field.

In the coating compositions, the pigment is preferably formulated in the amount of 0 to 300 parts by weight, more preferably 0 to 100 parts by weight based on 100 parts by weight of the total weight of the nonvolatile matter of the resin ingredient (A) and the curing agent ingredient (B) in the thermosetting composition. When the pigment is formulated, the amount of the pigment is preferably at least 0.1 parts by weight.

The pigments include various pigments of organic pigments and inorganic pigments. Examples of the pigments include surface treated metallic pigments such as aluminium, copper, brass, bronze, stainless steel, iron oxides of mica form, metallic powders of flake form and mica coated with titanium dioxide or iron oxides; inorganic pigments such as titanium dioxide, iron oxides, yellow iron oxide and carbon black; organic pigments such as phthalocyanine blue, phthalocyanine green and quinacridone red pigments; extender pigments such as precipitated barium sulfate, clay, silica and talc.

The multilayer paint films include that prepared by the coating method comprising applying a colored film forming composition on a substrate to form a base coat film and then applying a clear film forming composition of the this coating composition, which comprises the thermosetting composition, on the base coat film to form a clear top coat film (Example 1 of the multilayer paint film).

The colored film forming composition of the base coat film comprises a resin binder and a pigment. The resin binders include various binders such as a conventional acrylic resin, a polyester resin (containing an alkyd resin), a polyurethane resin and melamine resin.

The colored film forming composition of the base coat film can comprise at least one of conventional various additives such as a surface active agent, a leveling agent, a thixotropic agent, a filler, a defoaming agent, an organic solvent and a catalyst.

The amount of the pigment is preferably 1 to 80 percent by weight, more preferably 3 to 60 percent by weight in the colored film forming composition.

The pigments include various pigments of organic pigments and inorganic pigments. Examples of the pigments include surface treated metallic pigments such as aluminum, copper, brass, bronze, stainless steel, iron oxides of mica form, metallic powders of flake form and mica coated with titanium dioxide or iron oxides; inorganic pigments such as titanium dioxide, iron oxides, yellow iron oxide and carbon black; organic pigments such as phthalocyanine blue, phthalocyanine green and quinacridone red pigments; extender pigments such as precipitated barium sulfate, clay, silica and talc.

The method of applying the coating composition to form the multilayer paint film includes a method which comprises heating the colored film forming composition of the base coat film or controlling the viscosity by adding organic solvents or reactive diluents according to the needs, and applying the colored film forming composition on the substrate by conventional coating machines such as air spray, electrostatic air spray, roll coater, flow coater, dip type coating machine and the like, brush, bar coater or applicator in an amount to form a film having dried thickness of 0.5 to 300 $\mu$m and curing, in general, in the condition of 50 to 300° C. for 5 seconds to 24 hours, followed applying the clear forming composition of the clear coat film on the base coat by the above mentioned method in an amount to form a film having dried thickness of 10 to 100 $\mu$m, preferable 10 to 60 $\mu$m and curing, in general, in the condition of 50 to 300° C. for 5 seconds to 24 hours and the like and a method which comprises, in the case of two coat one bake coating, diluting the colored film forming composition with suitable solvents such as organic solvents to control the desirable viscosity, applying the base coat composition on the substrate by the above mentioned method in an amount to form a film having dried thickness of 5 to 40 $\mu$m, preferable 7 to 35 $\mu$m, allowing to stand at room temperature to 100° C. for 1 to 20 minutes, followed applying the clear forming composition of the clear coat film on the base coat by the above mentioned method in an amount to form a film having dried thickness of 10 to 100 $\mu$m, preferable 10 to 60 $\mu$m and curing, in general, in the condition of 50 to 300° C. for 5 seconds to 24 hours and the like. Preferable method of the application is the application by an air spray in the above mentioned methods.

Other multilayer paint films include that produced by a method which comprises applying a colored base coating composition on the substrate, followed by applying a clear coating composition on the uncured colored base coat and curing the coats, and then by applying an over clear coating composition on the clear coat and curing, wherein the clear coating composition is an acrylic resin-aminoplast resin coating composition and the over clear coating composition is the coating composition of this invention ((Example 2 of the multilayer paint film)).

The colored base coating composition is similar to that described in the above mentioned multilayer paint film.

The acrylic resin/aminoplast resin coating composition can be used as the clear coating composition applied on the uncured colored base coat. The acrylic resins include a resin produced by copolymerizing (a) a (meth) acrylic acid ester of an alkyl alcohol of 1 to 12 carbon atoms, (b) a polymerizable double bond-containing and hydroxyl group-containing monomer and (c) a polymerizable double bond-containing and carboxyl group-containing monomer, and optionally (d) styrene, (e) acrylonitrile and (f) other polymerizable double bond-containing monomer and the like. The preferable aminoplast resins include a melamine resin and a guanamine resin. The aminoplast resin may be utilized singly or in combination of two or more members. To be more concrete, the aminoplast resin is not particularly limited except that it has two or more reactive groups in the molecule. The triazin ring may be one or more in a molecule of the melamine resin and the guanamine resin. The preferable reactive group in the resins includes methylol group, imino group and groups etherificated with methanol or butanol. The formulation ratio of the acrylic resin and the aminoplast resin in the acrylic resin/aminoplast resin coating composition is not particularly limited and preferably 90:10 to 50:50, more preferably 80:20 to 60:40 in parts by weight.

A curing reaction catalyst for the aminoplast resin can be formulated in the acrylic resin/aminoplast resin coating composition. Preferable examples of the curing reaction catalysts for the aminoplast resin are, for example, a phosphoric acid curing catalyst, sulfonic acid curing agents such as toluenesulfonic acid and dodecylbenzenesulfonic acid and an amine blocked compound thereof. The curing reaction catalysts can be utilized singly or in combination of two or more members and may be utilized together with other compounds in order to control the curing time. The additional amount of curing reaction catalyst is preferably 0.01 to 2 percent by weight based on the total amount of nonvolatile matter in the acrylic resin/aminoplast resin coating composition.

The clear coating composition in the method of preparing the multilayer paint film can comprise additives such as a flow controlling agent, a leveling agent, an antigelling agent, an antioxidant, an ultraviolet absorber and a radical scavenger, according to the needs.

The preferable methods of preparing the multilayer paint film include a method which comprises controlling the viscosity by heating the colored film forming composition of the base coat film or adding organic solvents or reactive diluents according to the needs, and applying the colored film forming composition on the substrate by conventional coating machines such as air spray, electrostatic air spray, roll coater, flow coater, dip type coating machine and the like, brush, bar coater or applicator in the amount to form a film having dried thickness of 5 to 40 μm, preferably 7 to 35 μm and allowing to stand, in general, in the condition of a room temperature to 100° C. for 1 to 20 minutes, followed applying the clear coating composition on the base coat by the above mentioned method in the amount to form a film having dried thickness of 10 to 100 μm, preferable 10 to 60 μm and curing, in general, in the condition of 50 to 300° C. for 5 seconds to 24 hours and then applying the over clear coating composition on the clear coat by the above mentioned method in the amount to form a film having dried thickness of 5 to 50 μm, preferable 5 to 20 μm and then curing, in general, in the condition of 50 to 300° C. for 5 seconds to 24 hours.

In the examples of the multilayer paint film, a coating compositon comprising (A') an acrylic polyol resin and/or a polyester polyol resin, (B') one or more compounds selected from the group consisting of a polyisocyanate compound having two or more isocyanate groups per molecule, a polyblocked isocyanate compound having two or more blocked isocyanate groups per molecule and an aminoplast resin, and (C) a dispersing component of at least one inorganic oxide sol selected from the group consisting of an aluminum oxide sol, a silica sol, a zirconium oxide sol and an antimony oxide sol and an amount of nonvolatile matter of ingredient (C) is 0.1 to 60% by weight based on a total amount of nonvolatile matter of ingredient (A') and ingredient (B') (alternate coating composition) can be used as the clear film forming composition in Example 1 of the multilayer paint film or the over clear coating composition in Example 2 of the multilayer paint film. The alternate coating composition is one enbodiment of the thermosetting composition of the present invention.

Examples of the acryllic resin of ingredient (A') include a copolymer prepared by copolymerizing essentially (a) a (meth) acrylic acid ester of an alkyl alcohol of 1 to 12 carbon atoms, (b) a polymerizable double bond-containing and hydroxyl group-containing monomer and (c) a polymerizable double bond-containing and carboxyl group-containing monomer, and optionally (d) styrene, (e) acrylonitrile and (f) other polymerizable double bond-containing monomer.

The (meth) acrylic acid ester of an alkyl alcohol of 1 to 12 carbon atoms (hereinafter called "acrylic ester") of component (a) used as the essential monomer component is preferably used in ratio of 10 to 90 percent by weight based on total weight of the all monomers.

The acrylic ester is necessary and essential component to control the glass transition temperature of the paint film. When the alkyl group in the portion of the alcohol has carbon atoms of more than 12, the trend of the excess decrease in the glass transition temperature of the obtained resin is observed. When the amount of the acrylic ester is less than 10 percent by weight, it may be impossible to control the glass transition temperature of the obtained resin in the range of not less than 50° C. unless other monomers having lower polymerization reactivity are not used. If other monomers having lower polymerization reactivity are used, the weathering resistance of the paint film may be decreased. Contrariwise, when the amount of the acrylic ester is more than 90 percent by weight, the desired amount of hydroxyl groups and carboxyl groups is not introduced in the resin and the paint film having excellent weathering resistance, stain resistance and stain-removing property is difficult to obtain. Preferable amount of the acrylic ester is 35 to 80 percent by weight in order to obtain the paint film having desired and preferable properties.

The alkyl alcohol of 1 to 12 carbon atoms which constitute the acrylic ester of component (a) may be a straight chain alcohol, a branch chain alcohol or an alcohol having a cyclic alkyl group. Examples of acrylic esters of component (a) are, for example, methylmethacrylate, ethylmethacrylate, n-propylmethacrylate, isopropylmethacrylate, n-butylmethacrylate, isobutylmethacrylate, t-butylmethacrylate, pentylmethacrylate, hexylmethacrylate, cyclohexylmethacrylate, 2-ethylhexylmethacrylate, adamantylmethacrylate, dodecylmethacrylate, isobornylmethacrylate, methylacrylate, ethylacrylate, n-propylacrylate, isopropylacrylate, n-butylacrylate, isobutylacrylate, t-butylacrylate, pentylacrylate, hexylacrylate, cyclohexylacrylate, 2-ethylhexylacrylate, adamantylacrylate, dodecylacrylate, isobornylacrylate. The acrylic esters may be utilized singly or in combination of two or more members.

The polymerizable double bond-containing and hydroxyl group-containing monomer of component (b) used as essential monomer component is preferably used in ratio of 10 to 50 percent by weight based on total weight of the all monomers. When the amount is less than 10 percent by weight, it may be impossible to introduce crosslinking points needed in the obtained resin and to obtain the paint film having excellent weathering resistance, stain resistance and stain-removing property. On the other hand, when the amount is more than 50 percent by weight, the unreacted hydroxyl groups remain in crosslinking reaction between the obtained resin and ingredient (B).

Therefore, the water resistance and the moisture resistance are decreased and the decrease of the weathering resistance of the paint film is caused. Further, the crosslinking density of the paint film is excessively increased. Preferable amount of the monomer of component (b) is 10 to 30 percent by weight in order to obtain the paint film having desired properties by introducing the proper number of crosslinking points in the resin.

The polymerizable double bond-containing and hydroxyl group-containing monomer of component (b) includes, for example, hydroxyethylmethacrylate, hydroxypropylmethacrylate, hydroxybutylmethacrylate, 1,4-butandiolmonomethacrylate, ε-caprolactone adduct of hydroxyethylmethacrylate, ethylene oxide adduct of hydroxyethylmethacrylate, propylene oxide adduct of hydroxyethylmethacrylate, hydroxyethylacrylate, hydroxypropylacrylate, hydroxybutylacrylate, 1,4-butandiolmonoacrylate, ε-caprolactone adduct of hydroxyethylacrylate, ethylene oxide adduct of hydroxyethylacrylate, propylene oxide adduct of hydroxyethylacrylate. The monomers of component (b) may be utilized singly or in combination of two or more members.

The polymerizable double bond-containing and carboxyl group-containing monomer of component (c) as essential monomer component is preferably used in ratio of 0.1 to 10 percent by weight based on total weight of the all monomers. When the amount is less than 0.1 percent by weight, the acid value of the obtained resin is excessively decreased, and unfavourable points such as lower curability to the aminoplast resin are caused. When the amount is more than 10 percent by weight, the trend of the extreme decrease in storage stability and pot life of the coating composition is observed. The amount of component (c) is preferably 1 to 5 percent by weight, more preferably 1 to 3 percent by weight in view of storage stability and pot life of the coating composition.

Examples of component (c) are, for example, methacrylic acid, acrylic acid, itaconic acid, mesaconic acid, maleic acid, fumaric acid, ω-carboxy-polycaprolactone (n=2) monoacrylate (for example ALONIX M-5300, a product of TOA GOUSEI CHEMICAL INDUSTRY L.T.D.), phthalic acid monohydroxyethylacrylate (for example ALONIX M-5400, a product of TOA GOUSEI CHEMICAL INDUSTRY L.T.D.), acrylic acid dimer (for example ALONIX M-5600, a product of TOA GOUSEI CHEMICAL INDUSTRY L.T.D.). These may be used singly or in combination of two or more members.

Styrene of component (d) is not essential component and is optionally used to improve appearance such distinctness of image of the paint film. When styrene is used, the amount of styrene is preferably in ratio of not more than 20 percent by weight based on the total weight of all monomers. When the amount of styrene is more than 20 percent by weight, the trend of the decrease in the weathering resistance, stain resistance and stain-removing property of the paint film is observed. The amount of styrene is preferably 1 to 18 percent by weight in view of the balance of appearance such distinctness of image, weathering resistance, stain resistance and stain-removing property of the paint film.

Acrylonitrile of component (e) is not essential component and is optionally used to improve the adhesion of the paint film to a substrate and impact resistance. When acrylonitrile is used, the amount of acrylonitrile is preferably in ratio of not more than 20 percent by weight based on the total weight of all monomers. When the amount of acrylonitrile is more than 20 percent by weight, the trend of the decrease in the weathering resistance, stain resistance and stain-removing property of the paint film is observed. The amount of acrylonitrile is more preferably 1 to 18 percent by weight in view of the balance of the adhesion of the paint film to the substrate, weathering resistance, stain resistance and stain-removing property of the paint film.

Other polymerizable double bond-containing monomer of component (f) is not essential component and is optionally used according to substrates and the purpose of use in the designation of the paint film. When the other monomer is used, the amount is preferably in the range of not more than 10 percent by weight. When the amount of other monomer is more than 10 percent by weight, it is difficult to obtain the paint film having desired properties.

Examples of other monomers of component (f) is, for example, PHOSMER (a product of UNICHEMICAL L.T.D.), glycydilmethacrylate, glycidylacrylate, allylmethacrylate, allylacrylate, 3,4-epoxycyclohexylmethylmethacrylate, 3,4epoxycyclohexylmethylacrylate, phenylmethacrylate, phenylacrylate, α-methylstyrene, p-vinyltoluene, methacrylamide, acrylamide, N,N-dimethylmethacrylamide, N,N-dimethylacrylamide, methacrylic acid-1,2,2,6,6-pentamethyl-4-piperidyl ester, acrylic acid-1,2,2,6,6-pentamethyl-4-piperidyl ester, methacrylic acid-2,2,6,6-tetramethyl-4-piperidyl ester, acrylic acid-2,2,6,6-tetramethyl-4-piperidyl ester; aliphatic vinyl ethers such as ethyl vinyl ether, isopropyl vinyl ether, n-propyl vinyl ether, n-butyl vinyl ether, isobutyl vinyl ether, 2-ethylhexyl vinyl ether and cyclohexyl vinyl ether; 2,3-dihydrofuran, 3,4-dihydro-2H-pyran, trimethoxysilylpropylmethacrylate, maleic anhydride, itaconic anhydride, maleic acid ester and fumaric acid ester. These may be utilized singly or in combination of two or more members.

Also, fluorine-containing acrylic polyol resins introducing a fluorine atom in the acrylic polylol resin of ingredient (A) can be utilized in the present invention.

The fluorine-containing acrylic polyol resins can be prepared by copolymerizing the monomer described above and a fluorine-containing α,β-unsaturated monomer.

The fluorine-containing α,β-unsaturated monomer includes the same as described above.

The resin of ingredient (A') is obtained by copolymerizing the monomer mixture of the monomers. The polymerization method is particularly not limited. Various conventional polymerization methods such as solution polymerization in an organic solvent, suspension polymerization, emulsion polymerization, bulk polymerization and precipitation polymerization can be utilized. Also, the embodiment of the polymerization is particularly not limited. For example, radical polymerization, cation polymerization and anion polymerization can be utilized. Preferable the embodiment of the polymerization is radical polymerization in view of industrial point. Examples of polymerization initiators in radical polymerization are, for example, an organic peroxides such as t-butylhydroperoxide, cumenehydroperoxide, t-butylperoxyneodecanate, t-butylperoxypivalate, t-hexylperoxy-2-ethylhexanoate, methylethylketoneperoxide; and an azo initiators such as 2,2'-azobis (2,4-dimethylvaleronitrile), 2,2'-azobis (2-methylpropionitrile) (AIBN) and 2,2'-azobis (2-methylbutironitrile). Of course, other polymerization initiators than the above described polymerization initiators can be used. The polymerization initiators may be utilized singly or in combination of two or more members.

The polymerization temperature is preferably 60 to 150° C. in general. When the polymerization temperature is less than 60° C., the radical polymerizaition initiators are difficult to be decomposed and the polymerization reaction is difficult to be proceeded. When the polymerization temperature is more than 150° C., though the radical polymerizaition initiators are decomposed to generate radicals by heating, the life time of the radicals is short and a propagation reaction is difficult to be effectively proceeded. The polymerization time is indiscriminately not determined because of the influence of the polymerization temperature and the other conditions, but is generally sufficient at the level of 2 to 6 hours.

The polyester polyol resins include that prepared by condensation reaction of a polybasic acid and a polyhydric alcohol according conventional methods.

Examples of the polybasic acid used for the polyester polyol resins include aliphatic polycarboxylic acids of 2 to 22 carbon atoms, such as succinic acid, adipic acid, azelaic acid, sebacic acid and decamethylenedicarboxylic acid; aromatic polycarboxylic acids, such as phthalic acid, isophathalic acid, terephathalic acid, trimellitic acid and pyromellitic acid; alicyclic polycarboxylic acids, such as tetrahydrophthalic acid and hexahydrophthalic acid; and acid anhydrides such as succinic anhydride, maleic anhydride, phthalic anhydride, tetrahrydophthalic anhydride, tetrabromophthalic anhydride, tetrachlorophthalic anhydride, hexahydrophthalic anhydride, trimellitic anhydride and pyromellitic anhydride. These polybasic acids may be used singly or in combination of two or more members.

Examples of the polyhydric alcohol include: alcohols such as ethylene glycol, 1,2-propylene glycol, 1,3-propylene glycol, 1,3-butanediol, 1,4-butanediol, 2,3-butanediol, 1,6-hexanediol, diethylene glycol, pentanediol, dimethylbutanediol, hydrogenated bisphenol A, glycerol, sorbitol, neopentyl glycol, 1,8-octanediol, 1,4-cyclohexanedimethanol, 2-methyl-1,3-propanediol, 1,2,6-hexanetriol, 1,2,4-butanetriol, trimethylolethane, trimethylolpropane, pentaerythritol, quinitol, mannitol, trishydroxyethyl isocyanurate and dipentaerythritol; addition products of the polyhydric alcohols with a lactone, such as γ-butyrolactone and ε-caprolactone, by ring opening of the lactone; addition products of the polyhydric alcohol with an isocyanate, such as tolylene diisocyanate, diphenylmethane diisocyanate, hexamethylene diisocyanate and isophorone diisocyanate, in excess amount of the alcohol; addition products of the polyhydric alcohols with a vinyl ether, such as ethylene glycol divinyl ether, polyethylene glycol divinyl ether, butanediol divinyl ether, pentanediol divinyl ether, hexanediol divinyl ether and 1,4-cyclohexanedimethanol divinyl ether, in excess amount of the alcohol; condensation products of the polyhydric alcohol with an alkoxysilicone compound, such as KR-213®, KR-217®, KR-9218® (products of Shin-Etsu Chemical Co., Ltd.), in excess amount of the alcohol. These polyhydric alcohols may be used singly or in combination of two or more members.

The resin used as the resin (A') has preferably a glass transition temperature of 50 to 120° C. When the glass transition temperature is less than 50° C., the obtained paint film may has insufficient hardness and the paint film having excellent weathering resistance is difficult to obtain. When the glass transition temperature is more than 120° C., the operation efficiency in coating process may be bad and the obtained paint film is lower in appearance such as distinctness of image and gloss. The lower stain-removing property, which is a defect of the coating composition suggested in Laid Open Japanese Patent Applications Heisei 4-173882, is improved by controlling the glass transition temperature in the range described above. Preferable glass transition temperature is in the range of 50 to 100° C. in view of hardness, appearance and stain-removing property of the paint film and operation efficiency.

The resin has preferably a number average molecular weight of 3,000 to 100,000. When the number average molecular weight is less than 3,000, the obtained paint film may has insufficient weathering resistance. When the number average molecular weight is more than 100,000, the operation efficiency may be bad in coating process. The number average molecular weight of the resin (A) is preferably 4,000 to 70,000, more preferably 4,500 to 40,000 in view of weathering resistance of the paint film and operation efficiency.

The resin has preferably a hydroxyl value of 50 to 150 mgKOH/g. When the hydroxyl value is less than 50 mgKOH/g, the obtained paint film has insufficient crosslinking density and the paint film having excellent stain resistance and excellent stain-removing property is difficult to obtain. When the hydroxyl value is more than 150 mgKOH/g, cracks in the paint film is easily caused because contraction stress become large by excessive density of the structure of the paint film at formation of the paint film and is impossible to be relaxed. The hydroxyl value is preferably in the range of 50 to 130 mgKOH/g in view of stain resistance, stain-removing property and the inhibition of cracks of the paint film.

The resin has preferably an acid value of 1 to 25 mgKOH/g. When the acid value is less than 1 mgKOH/g, unfavourable points such as lower curability to the aminoplast resin may be caused. When the acid value is more than 25 mgKOH/g, the trend of the extreme decrease in the storage stability and pot life of the coating composition is observed. The acid value is more preferably 2 to 20 mgKOH/g in view of storage stability and the pot life of the coating composition.

One or more compounds selected from the group consisting of a polyisocyanate compound having two or more isocyanate groups in the molecule, a polyblocked isocyanate compound having two or more blocked isocyanate groups in the molecule and an aminoplast resin are used as a curing agent of ingredient (B') in the coating composition of the present invention.

Examples of the polyisocyanate compound are, for example, compounds called "iscyanate monomer" such as hexamethylenediisocyanate, isophoronediisocyanate, tolylenediisocyanate, diphenylmethanediisocyanate, xylylenediisocyanate and dicyclohexylmethan-4,4'-diisocyanate; and polyisocyanate derivatives such as biulet compounds, isocyanurate derivatives and trimethylolpropane adducts thereof. The polyisocyanate compound may be utilized singly or in combination of two or more members.

The polyblocked isocyanate compound can be, for example, produced by blocking the polyisocyanate compounds described above. A blocking agent used in blocking reaction can be properly selected.

Examples of the blocking agents are, for example, ε-caprolactam; a ketoxime blocking agents such as methylethylketoxime, methylisoamylketoxime and methylisobutylketoxime; a phenol blocking agents such as phenol, cresol, catechol and nitrophenol; an alcohol blocking agents such as isopropanol and trimethylolpropane; and an active methylene blocking agents such as malonic acid ester and acetoacetic acid ester. The polyblockedisocyanate compounds may be utilized singly or in combination of two or more members.

Preferable examples of the aminoplast resins are melamine resin and guanamine resin. The aminoplast resins may be utilized singly or in combination of two or more members. The aminoplast resins are not restricted as long as the aminoplast resins have two or more reactive groups in the molecule. Therefore, the melamine resin and the guanamine resin may have one or more triazine rings in the molecule. The reactive groups in the resins include preferably methylol group, imino group and an etherificated methylol group with methanol, butanol or the like.

Ingredient (A') and ingredient (B') are formulated in the following ratio. When ingredient (B') is the polyisocyanate compound having two or more isocyanate groups in the molecule and/or the polyblocked isocyanate compound having two or more blocked isocyanate groups in the molecule, a mole ratio of isocyanate groups and/or blocked isocyanate groups in ingredient (B') to hydroxyl groups in ingredient (A') is preferably 0.6 to 1.6, more preferably 0.8 to 1.2. When the mole ratio is less than 0.6, a part of the hydroxyl groups in the resin of ingredient (A') may not react and remain in the crosslinking reaction of the polyisocyanate compound of ingredient (B') and the resin of ingredient (A'), so that the water resistance and moisture resistance of the obtained paint film may decrease and further the weathering resistance of the paint film may cause by the decrease of the water resistance and moisture resistance. On the other hand, when the mole ratio is more 1.6, a part of isocyanate groups and/or blocked isocyanate groups may not react and remain. In such case, the water resistance and moisture resistance of the obtained paint film may decrease so that the weathering resistance of the paint film may decrease by the decrease of the water resistance and moisture resistance.

When ingredient (B') is the aminoplast resin, the weight ratio of the nonvolatile matter of ingredient (A') to ingredient (B') is preferably in the range of 97:3 to 60:40, more preferably in the range of 95:5 to 65:35, most preferably in the range of 91:9 to 70:30.

In the alternate coating composition, a tin compound or a zinc compound may be utilized as the curing reaction catalysts. The tin compounds include tin halides such as tin chloride and tin bromide; organic tin compounds such as dibutyltindiacetate and dibutyltindilaurate. The zinc compounds include zinc halides such as zinc chloride and zinc bromide; organic acid zinc salts such as zinc octanoate and zinc laurate. The preferable amount of the curing reaction catalyst is 0.01 to 5 percent by weight based on the total amount of nonvolatile matter in the coating composition comprising the inorganic sol. When the amount of the curing reaction catalyst is less than 0.01 percent by weight, the promoting effect of the curing reaction may be insufficiently exerted. When the amount of the curing reaction catalyst is more than 5 percent by weight, the water resistance and moisture resistance of the paint film may be decreased, and the decreases of the stain resistance, removing resistance and weathering resistance of the paint film may be caused. The more preferable amount of the curing reaction catalyst is 0.01 to 2 percent by weight based on the total amount of nonvolatile matter of the composition in view of the balance of the curing rate and the properties of the paint film. The tin compound and the zinc compound of the curing reaction catalyst may be utilized singly or in combination of two or more members and may be utilized together with other curing reaction catalysts.

In the alternate coating composition, when the aminoplast resin is used as ingredient (B'), a curing reaction catalyst for the aminoplast resin may be utilized. The curing reaction catalysts for the aminoplast resin are preferably phosphoric acid curing catalyst, sulfonic acid curing catalysts such as toluenesulfonic acid and dodecylbenzenesulfonic acid, and the amine-blocked compound thereof. The curing reaction catalysts may be utilized singly or in combination of two or more members and may be utilized together with other curing reaction catalysts in order to control the curing time. The preferable addition amount of these compounds is 0.01 to 2 percent by weight based on the total amount of nonvolatile matter of the coating composition comprising the inorganic sol. With respect to the reason, when the amount of these compounds is less than 0.01 percent by weight, the effect of these compounds resin may be not manifested in curing of the coating composition. When the amount of the curing reaction catalyst is more than 2 percent by weight, the properties such as water resistance and moisture resistance of the paint film may become bad by the influence of these compounds after forming the paint film and the stain resistance, removing properties of stain and weathering resistance of the paint film may be decreased.

The dispersing component of the inorganic oxide sol in the alternate coating composition is the same as ingredient (C) in the thermosetting composition of the present invention. The formulation amount and the preferable range of the formulation amount of ingredient (C) is the same as ingredient (C) in the thermosetting composition of the present invention.

The preparation methods of the alternate coating composition are not particularly limited and various methods can be used.

The following method is preferable because it can prepare efficiently the alternate coating composition. Thus, the alternate coating composition can be prepared by dispersing and stabilizing the dispersing component of the inorganic oxide sol of ingredient (C) into a polymerization solvent and then by conducting the polymerization of the resin of ingredient (A') in the same polymerization condition as described above, or by conducting the polymerization of the resin of ingredient (A') and then by dispersing and stabilizing the dispersing component of the inorganic oxide sol into the resin solution under heating or without heating to produce a resin solution dispersing and stabilizing the dispersing component of the organic oxide sol, and optionally by mixing homogeneously the resin of ingredient (A') and the curing agent of ingredient (B'), and, according to needs, various additives.

The kind of the substrate on which the coating composition comrising the thermosetting composition of the present invention or the alternate coating composition is applied is not particularly limited, but various kinds of organic or inorganic substrate materials, such as woods, glasses, metals, fabrics, plastics, foamed articles, elastomers, papers, ceramics, concretes and gypsum boards, may be utilized. The substrates may be treated on the surface and coated with coating compositions.

Coated articles prepared by the coating composition comprising the thermosetting composition of the present invention or the alternate coating composition include buildings, structures, wood articles, metallic articles, plastics articles, rubber articles, coated papers, ceramic articles and glass articles, specifically automobiles, parts for automobiles (for example, body, bumper, spoiler, mirror, wheel such as aluminum wheel and inner package material, and these parts are made of various materials), metal plates such as steel plates, two-wheel vehicles, parts for two-wheel vehicles, materials for road (for example, guard rail and traffic control sign), materials for tunnel (for example, sidewall plate), marine vessels, railway vehicles, airplanes, printing machines, parts for printing machines, furnitures, musical instruments, house-hold electric instruments, building materials, vessels, office articles, sport articles and toys.

The thermosetting composition of the invention can be utilized in a coating composition, an ink, an adhesive agent and a molded article.

EXAMPLES

The invention is explained in detail with reference to the following examples; however, these examples are intended to illustrate the invention and are not to be construed to limit the scope of the invention.

Evaluation of the properties of the cured films obtained by coating compositions comprising the thermosetting compositions of the present invention were conducted as follows.

(1) distinctness of image

The distinctness of image of the cured film was evaluated by visual observation according to the following standard.

○: When a fluorescent lamp was projected on the cured film, the image of the fluorescent lamp was vividly observed.

Δ: When a fluorescent lamp was projected on the cured film, the image of the outline of the fluorescent lamp was dimly observed.

X: When a fluorescent lamp was projected on the cured film, the image of the fluorescent lamp was remarkable dimly observed.

(2) weathering resistance

By using a weathering resistance tester of sunshine carbon arc lamp (Japanese Industrial Standard K-5400 (1990) 9.8.1), a test piece was exposed for 1000 or 3000 hours and 60 degree specular gloss (Japanese Industrial Standard K-5400 (1990) 7.6 specular gloss) of the cured film was measured. Condition of the cured film was observed by visual comparison or compared with the condition before the exposure by using the measured values of gloss.

(3) stain property in atmospheric exposure

The atmospheric exposure test of test piece was conducted for 30 days and the color of unwashed surface of the cured film was measured according to the measurement method of Japanese Industrial Standard K-5400 (1990) 7.4.2. Stain property was evaluated by a difference (ΔL) which is calculated by subtracting initial L value before the atmospheric exposure from L value after the atmospheric exposure.

(4) oil ink stain resistance

On the test piece, a line of oil ink was drawn and the test piece was heat at 80° C. for 5 hours. And the line of oil ink was wiped with a flannel soaked with xylene. The surface condition of the test piece was observed by visual and was evaluated in the following standard.

○: The line of oil ink was completely wiped and there was not the trace left behind.

Δ: The trace of the line was observed in small portions.

X: The trace of the line was clearly observed.

(5) moisture resistance

The test piece was exposed under the condition of 40±1° C. and relative humidity of 95 or more % for 240 hours and then was taken out. The surface condition of the test piece was observed by visual after 2 hours from taking out and was evaluated according to the following standard.

○: The change of the gloss and the surface condition of the test piece was not observed compared with an original test piece.

Δ: The change of the gloss and blistering of the test piece was observed in small portions compared with an original test piece.

X: The change of the gloss and blistering of the test piece was remarkably observed compared with an original test piece.

(6) acid resistance

On a test piece, 2 ml of 40 weight % sulfuric acid was applied as spots and condition of the cured film was observed by visual comparison after heating for 30 minutes at 60° C.

(7) adhesive property

By the adhesive property test according to Japanese Industrial Standard K-5400 (1990) 8.5.1 cross cut method, the adhesive property was evaluated in the following standard.

○: 10 point
Δ: 8 point
X: not more than 6 point

Preparation Example 1

Preparation of a solution of compound A-1 of ingredient (A)
(1) Preparation of polycarboxylic acid compound A-1 (a) solution Into a four-necked flask equipped with a thermometer, a reflux condenser, a stirrer and a dropping funnel, the following components were charged and the mixture was heated under stirring until the temperature reached to 120° C.

pentaerythritol 136.0 parts by weight methyl isobutyl ketone 538.7 parts by weight To the mixture kept at 120° C., 672.0 parts by weight of methylhexahydrophthalic anhydride was added by dropping for 2 hours and the mixture was kept stirring under heating until acid value of the mixture decreased to a value of not more than 170. The acid value was measured by diluting the same sample 50 times by weight with a mixture of pyridine and water (pyridine/water=9/1 (by weight)), heating for 30 minutes at 90° C. and titrating with a standard solution of potassium hydroxide. Thus, the solution of a tetrafunctional polycarboxylic acid compound A-1 (a) was prepared.
(2) Preparation of compound A-1 solution Into a flask of the same kind as the above, a mixture of the following composition including the polycarboxylic acid compound prepared above was charged and kept stirring at 50° C.

| | |
|---|---|
| the solution of polycarboxylic acid compound (1) | 336.7 |
| isobutyl vinyl ether | 120.2 |
| hydrochloric acid, 35 weight % | 0.2 |
| methyl isobutyl ketone | 46.3 |

(quantity in parts by weight)

The reaction was finished when acid value of the mixture decreased to a value of not more than 12 and the mixture was transferred to a separation funnel after cooling by standing. The reaction mixture was washed with 100 parts by weight of alkaline water containing 10 weight % of sodium bicarbonate in the funnel and then washed with 300 parts by weight of deionized water repeatedly until pH of the washing water became 7 or below. And then the organic layer was dried by adding Molecuar Sieves®4A1/16 and standing for 3 days at the room temperature. As a result, a solution of compound A-1 having properties shown in Table 1 was obtained.

TABLE 1

| | | Preparation Example 1 |
|---|---|---|
| characteristics of polycarboxylic acid compound | average functional group number | 4 |
| | acid equivalent (g/mol) | 336.7 |
| | blocking agent | isobutyl vinyl ether |
| characteristics[1] | nonvolatile matter (wt %) | 60.0 |
| | Gardner viscosity | E–F |

Note 1)
Nonvolatile matter: The residue was measured after drying for 3 hours at 50° C. under 0.1 mm Hg.
Gardener viscosity (25° C.) was measured by a Gardener viscometer according to Japanese Industrial Standard K 5400 (1990) 4.5.1.

Preparation Example 2

Preparation of a solution of compound A-2 of ingredient (A)
(1) Preparation of polycarboxylic acid compound A-2 (a) solution Into a four-necked flask equipped with a thermometer, a reflux condenser, a stirrer and a dropping funnel, the following component was charged and the mixture was heated under stirring until the temperature reached to 140° C.

> trimethylol propane 134.2 parts by weight

To the mixture kept at 140° C., 420.4 parts by weight of methylhexahydrophthalic anhydride melted by heating was added by dropping for 2 hours and the mixture was kept stirring under heating until acid value of the mixture decreased to a value of not more than 285. The acid value was measured by diluting the same sample 50 times by weight with a mixture of pyridine and water (pyridine/water=9/1 (by weight)), heating for 30 minutes at 90° C. and titrating with a standard solution of potassium hydroxide. Thus, a solution of compound A-2 (a) was prepared.

(2) Preparation of compound A-2 solution

Into an autoclave, a mixture of the following composition including the polycarboxylic acid compound prepared above was charged and sufficiently mixed at 130° C. And then, the temperature of the mixture was decreased at 50° C. and the mixture was kept stirring.

| | |
|---|---|
| polycarboxylic acid compound A-2 (a) solution | 272.3 |
| n-propyl vinyl ether | 120.2 |
| 2-ethylhexyl phosphate | 0.2 |
| methyl isobutyl ketone | 46.3 |

(quantity in parts by weight)

The reaction was finished when acid value of the mixture decreased to a value of not more than 10. A solution of compound A-2 having properties shown in Table 2 was obtained.

TABLE 2

| | Preparation Example 2 |
|---|---|
| characteristics of polycarboxylic acid compound | |
| average functional group number | 3 |
| acid equivalent (g/mol) | 185 |
| blocking agent | n-propyl vinyl ether |
| characteristic [1] nonvolatile matter (wt %) | 90.0 |

Note
[1] Nonvolatile matter : The residue was measured after drying for 3 hours at 50° C. under 0.1 mmHg.

Preparation Example 3

Preparation of a solution of compound A-3 of ingredient (A)

The following amount of the monomers, the catalyst solution and sodium borate were charged into a stainless autoclave equipped with a stirrer and nitrogen substitution, cooling and caking, and degassing were carried out. And then, a fluorine-containing monomer was introduced into the autoclave and the internal temperature of the autoclave was increased gradually until the temperature reached to 60° C. Further, the reaction was continued at the same temperature for 20 hours. When the internal pressure of the autoclave was decreased to below 1 kg/cm$^2$, the autoclave was cooled and the reaction was stopped. An obtained resin solution was charged into great excess heptane and a produced resin was deposited. Further, the resin was washed and dried to obtain a fluorine-containing compound. All of the obtained resin were dissolved in xylene and a resin solution having nonvolatile matter of 50% by weight was obtained.

| | |
|---|---|
| hydroxybutyl vinyl ether | 33.5 parts by weight |
| ethyl vinyl ether | 4.3 parts by weight |
| cyclohexyl vinyl ether | 4.3 parts by weight |
| methyl isobutyl ketone | 200.0 parts by weight |
| 2,2'-azobisisobutyronitrile | 2.0 parts by weight |
| sodium borate | 0.5 parts by weight |
| fluorine-containing monomer (CF$_2$=CFCl) | 57.9 parts by weight |

Furthermore, 200 parts by weight of the resin solution, 44.5 parts by weight of hexahydrophthalic anhydride and 44.5 parts by weight of methyl isobutyl ketone were charged into a four-necked flask equipped with a thermometer, a reflux condenser, a stirrer and a nitrogen gass introduction tube and was heat under nitrogen stream and stirring to maintain 120° C. During the reaction, acid value of the mixture was measured. When the acid value of the mixture became a value of not more than 57, the reaction was finished. The acid value was measured by diluting the same sample 50 times by weight with a mixture of pyridine and water (pyridine/water=9/1 (by weight)), heating for 30 minutes at 90° C. and titrating with a standard solution of potassium hydroxide. The obtained resin solution was a polycarboxyl compound solution containing a nonvolatile matter of 50% by weight. And, the mixture of the following composition containing the polycarboxyl compound solution obtained by the above mentioned reaction was charged into the same four-necked flask as described above and was stirred at room temperature. When the acid value of the mixture became a value of not more than 1, the reaction was finished. Three parts by weight of KYOWARD 500 (a synthetic acid absorbent produced by KYOWA Chemical Industries Co., Ltd.) was added in the reaction mixture and the reaction mixture was stirred at room temperature for 48 hours. After filtration, filtrate was charged into an evaporator and 7 parts by weight of the solvent was destillated and removed from the filtrate. A fluorine-containing compound A-3 having a number average molecular weight of 5,200 and a nonvolatile matter of 50% by weight was prepared.

| | |
|---|---|
| polycarboxyl compound solution | 200.0 parts by weight |
| ethyl vinyl ether | 18.7 parts by weight |
| monooctyl phosphate | 0.2 parts by weight |
| xylene | 10.0 parts by weight |

Preparation Examples 4 and 5

Preparation of the compound B-1 solution and B-2 solution

Into a four-necked flask equipped with a thermometer, a reflux condenser, a stirrer and a dropping funnel, 40.0 parts by weight of initial charged solvent (xylene) was charged, heated under stirring and kept at 100° C. A mixture of monomers and a polymerization initiator shown in Table 3 (dropping component) was added by dropping to the solvent at 100° C. at a constant rate for 2 hours. When the addition of the dropping component was finished, the mixture was kept at 100° C. for further 1 hour and then, an additional amount of initiator solution shown in Table 3 (additional catalyst) was added to the mixture. The mixture was kept at 100° C. for 2 hours before finishing the reaction. Finally, the solutions of compounds B-1 and B-2 having properies shown in Table 3 were obtained.

TABLE 3

| Preparation Example | 4 | 5 |
|---|---|---|
| kind of compond of ingredient (B) | B - 1 | B - 2 |
| xylene (pars by weight) | 40.0 | 40.0 |
| dropping component (parts by weight) | | |
| glycidyl methacrylate | 28.40 | 28.40 |
| n-butyl methacrylate | 20.00 | 24.45 |
| methyl methacrylate | 27.70 | — |
| 2-ethylhexyl acrylate | 23.90 | — |
| 2-ethylhexyl methacrylate | — | 74.15 |
| 2,2'-azobisisobutyronitrile | 2.00 | 6.00 |
| n-butyl acetate | 54.00 | 50.00 |
| additional catalyst (parts by weight) | | |
| n-butyl acetate | 3.80 | 3.80 |
| 2,2'-azobisisobutyronitrile | 0.20 | 0.20 |
| characteristic [1] | | |
| nonvolatile matter (wt %) | 50.8 | 58.6 |

Note
[1] Nonvolatile matter : The residue was measured after drying for 3 hours at 50° C. under 0.1 mmHg.

Preparation Example 6

Preparation of a solution of compound B-3 of ingredient (B)

Into a stainless autoclave equipped with a stirrer, the following amount of the monomers, the catalyst solution and sodium borate were charged and nitrogen substitution, cooling and caking, and degassing were carried out. And then, the following fluorine-containing monomer was introduced into the autoclave and the internal temperature of the autoclave was increased gradually until the temperature reached to 60° C. Further, the reaction was continued at the same temperature for 20 hours. When the internal pressure of the autoclave was decreased to below 1 kg/cm$^2$, the autoclave was cooled and the reaction was stopped. An obtained resin solution was charged into great excess heptane and a produced resin was deposited. Further, the resin was washed and dried to obtain a fluorine-containing compound B-3 in the yield of 90% by weight. The number average molecular weight of the obtained resin was 6, 300 by gel permeation chromatography (GPC). All of the obtained resin were dissolved in xylene and a resin solution having nonvolatile matter of 50% by weight was obtained.

| | |
|---|---|
| glycidyl vinyl ether | 20.0 parts by weight |
| ethyl vinyl ether | 15.0 parts by weight |
| cyclohexyl vinyl ether | 15.0 parts by weight |
| methyl isobutyl ketone | 200.0 parts by weight |
| 2,2'-azobisisobutyronitrile | 2.0 parts by weight |
| sodium borate | 0.5 parts by weight |
| fluorine-containing monomer (CF$_2$=CFCl) | 57.9 parts by weight |

Preparation Example 7

Preparation of compound C-1 of ingredient (C)

Into a reaction vessel equipped with a stirrer, a thermometer, a reflux condenser having a Dean·Stark trap and a dropping funnel, 1000 parts by weight of SNOWTEX MIBK-ST (a product of Nissan Chemical Industries, Ltd., a dispersing component of silica sol (average particle diameter: 30 nm), non-volatile material: 30 percent by weight, solvent:methylisobutylketone) and 40 parts by weight of A-163 (a product of Nippon Unicar Co., Ltd., a silane coupling agent) were charged and the mixture was heated and kept at 80° C. for 8 hours. The resultant silica sol surface-treated with a silane coupling agent was obtained in 1020 parts by weight. The average particle diameter of the dispersing component of silica sol is 32 nm.

Preparation Examples 8 and 9

Preparation of solutions of thermal latent acid catalyst D-1 and D-2 of ingredient (D)

Into a four-necked flask equipped with a thermometer, a reflux condenser, a stirrer and a dropping funnel, a epoxy group-containing compound of component (i) and a solution of the Lewis acid of component (iii) each shown in Table 4 were charged and mixed at room temperature. And then, a sulfur atom-containing compound of component (ii) shown in Table 4 was dropped into the mixture and the mixture was stirred for 2 hours at 70° C. The mixture was cooled by standing. And when the temperature of the mixture was decreased until room temperature, a carboxylic acid compound compound of component (iv) shown in Table 4 was added into the mixture. The mixture was stirred for 1 hour at room temperature and the solutions of thermal latent acid catalyst D-1 and D-2 shown in Table 4 were obtained.

TABLE 4

| Preparation Example | 8 | 9 |
|---|---|---|
| kind of thermal latent acid catalyst (D) | D - 1 | D - 2 |
| formulation ratio (parts by weight) | | |
| component (i) | | |
| methylglycidyl ether | 13.5 | — |
| cyclohexene oxide | — | 31.6 |
| component (ii) | 30.9 | 30.9 |
| di-n-hexyl sulfide | | |
| component (iii) | | |
| methylethyl ketone solution containing 20.9 wt % of zinc chloride | 100.0 | 100.0 |
| component (iv) | | |
| 2-ethylhexyl acid | — | 17.6 |
| propionic anhydride | 19.9 | 4.0 |
| solution concentration (% by weight) | 51.9 | 57.0 |

Preparation Example 10

Preparation of compound of ingredient (E)

(1) Preparation of α,β-unsaturated compound

A mixture shown in Table 5 was charged into a four-necked flask which is equipped with a thermometer, a reflux condenser and a stirrer and stirred at 50° C. The reaction was finished when the acid value of the mixture decreased to a value of not more than 30 and the reaction mixture was transferred to a separation funnel after cooling by standing. The reaction mixture was washed with 100 parts by weight of alkaline water containing 10 weight % of sodium bicarbonate in a separation funnel and then washed with 200 parts by weight of deionized water repeatedly until the pH of the washing water became below 7. The organic layer was dried by adding Molecular Sieves® 4A1/16 (a product of Wako Pure Chemical Industries Co., Ltd.) and standing for 3 days at the room temperature. The α,β-unsaturated compound containing effective components shown in Table 5 was prepared.

TABLE 5

| Preparation Example | 10 |
|---|---|
| raw material composition (parts by weight) | |
| methacrylic acid | 86.0 |
| isobutyl vinyl ether | 120.2 |
| hydroxy monomethyl ether | 0.2 |
| 2-ethylhexyl phosphate | 0.1 |
| effective component content[1] (% by weight) | 95.3 | note
[1] The effective component content was measured by gas chromatography
(2) Preparation of compound of ingredient (E)

Into a four-necked flask equipped with a thermometer, a reflux condenser, a stirrer and a dropping funnel, the amount of an initial charged solvent (xylene) described in Table 6 was charged, heated under stirring and kept at 80° C. A mixture of monomers and a polymerization initiator shown in Table 6 (dropping component) was added by dropping to the mixture at 80° C. at a constant rate for 2 hours. After the addition of the dropping component was finished, the mixture was kept at 80° C. for further 1 hour and then, an additional amount of a polymerization initiator solution shown in Table 6 (additional catalyst) was added to the mixture. The mixture was kept at 80° C. for 4 hours before finishing the reaction and finally the solution of compound E having the properties shown in Table 6 were obtained.

TABLE 6

| Preparation Example | 10 |
|---|---|
| xylene (pars by weight) | 40.0 |
| dropping component (parts by weight) | |
| α,β-unsaturated compound | 20.7 |
| glycidyl methacrylate | 17.0 |
| n-butyl acrylate | 23.6 |
| 2-ethylhexyl methacrylate | 58.7 |
| 2,2'-azobisisobutyronitrile | 4.5 |
| n-butyl acetate | 28.7 |
| additional catalyst (parts by weight) | |
| n-butyl acetate | 6.4 |
| 2,2'-azobisisobutyronitrile | 0.4 |
| characteristic [1] | |
| nonvolatile matter (wt %) | 59.5 |
| Gardener viscosity | S |

Note [1]
Nonvolatile matter: The residue was measured after drying for 3 hours at 50° C. under 0.1 mmHg.
Gardener viscosity (25° C.) was measured by a Gardener viscometer according to Japanese Industrial Standard K 5400 (1990) 4.5.1.

Application to two coat one bake metallic color coating
Examples 1 through 11
(1) Preparation of clear coating compositions
One component clear coating compositions were prepared by mixing raw materials shown in Table 7.
(2) Preparation of test piece and Evaluation of cured film properties
Cationic electrodeposition coat AQUA No. 4200® (a product of NOF CORPORATION) was applied by electrodeposition to a soft steel plate treated with zinc phosphate in an amount to form a film having dried thickness of 20 μm and the coated plate was baked at 175° C. for 25 minutes. Intermediate coat EPICO No. 1500CP Sealer® (a product of NOF CORPORATION) was applied to the prepared plate by air spraying in an amount to form a film having dried thickness of 40 μg m and the plate was baked at 140° C. for 30 minutes. And further a silver metallic base coating composition, BELCOAT No. 6000® (a product of NOF CORPORATION) was applied to intermediate coat by air spraying in 2 stages with interval of 1 minute 30 seconds in an amount to form a film having dried thickness of 15 μm. After the coated pieces were set at 20° C. for 3 minutes to obtain a test panel, the raw coating compositions prepared in above mentioned (1) were diluted with thinner (xylene) to a viscosity required for spraying (25 seconds at 20° C. by Ford cup No. 4) and were applied on the test panel by air spray coating. Test pieces were prepared by baking the coated panels at 140° C. for 30 minutes. Results of the evaluation of cured film properties are shown in Table 8. In all cases, uniform cured films having good gloss were prepared. All the cured films under baking condition of 140° C. had excellent disinctness of image, weathering resistance, stain property in atmospheric exposure, oil ink stain resistance, moisture resistance, acid resistance and adhesive resistance
(3) Evaluation of storage stability
The coating compositions prepared in above mentioned (1) were diluted with thinner (xylene) to the viscosity of 1 poise (measured by rotary viscometer method of Japanese Industrial Standard K-5400 (1990) 4.5.3 type at 20° C.) and stored in a sealed condition at 40° C. After the diluted coating compositions were stored for 30 days at 40° C., the viscosities were measured. Results listed in Table 7 show that the increase of viscosity was very slight in all cases and the coating composition had the excellent storage stability.

TABLE 7

| Example | 1 | 2 | 3 | 4 | 5 |
|---|---|---|---|---|---|
| formulation ratio (parts by weight) | | | | | |
| (A) | | | | | |
| compound A - 1 | 50.5 | 50.5 | 50.5 | 50.5 | — |
| compound A - 2 | — | — | — | — | 29.8 |
| (B) | | | | | |
| compound B - 1 | 98.4 | 98.4 | 98.4 | 98.4 | — |
| compound B - 2 | — | — | — | — | 108.4 |
| (C) | | | | | |
| compound C - 1 | 11.7 | — | 35.0 | 58.3 | 27.3 |
| untreated material | — | 10.0 | — | — | — |
| (D) | | | | | |
| compound D - 1 | 5.7 | 5.7 | 5.7 | 5.7 | — |
| compound D - 2 | — | — | — | — | 7.5 |
| (E) | — | — | — | — | — |
| compound E | | | | | |
| storage stability (40° C.) | | | | | |
| initial viscosity (poise) | 1.0 | 1.0 | 1.0 | 1.0 | 1.0 |
| viscosity after 30 days (poise) | 1.2 | 1.2 | 1.2 | 1.2 | 1.2 |
| Example | 6 | 7 | 8 | 9 | 10 | 11 |
| formulation ratio (parts by weight) | | | | | | |
| (A) | | | | | | |
| compound A - 1 | — | — | — | 10.1 | 50.5 | — |
| compound A - 2 | 29.8 | 29.8 | 29.8 | — | — | — |
| compound A - 3 | — | — | — | — | — | 80.1 |
| (B) | | | | | | |
| compound B - 1 | — | — | — | — | — | 75.7 |
| compound B - 2 | 108.4 | 108.4 | 108.4 | — | — | — |
| compound B - 3 | — | — | — | — | 98.4 | — |
| (C) | | | | | | |

TABLE 7-continued

| | | | | | | |
|---|---|---|---|---|---|---|
| compound C - 1 | — | 54.6 | 81.9 | 62.2 | 11.7 | 11.7 |
| untreated material | 23.4 | — | — | — | — | — |
| (D) | | | | | | |
| compound D - 1 | — | — | — | 10.2 | 5.7 | 5.7 |
| compound D - 2 | 7.5 | 7.5 | 7.5 | — | — | — |
| (E) | | | | | | |
| compound E | — | — | — | 202.5 | — | — |
| storage stability (40° C.) | | | | | | |
| initial viscosity (poise) | 1.0 | 1.0 | 1.0 | 1.0 | 1.0 | 1.0 |
| viscosity after 30 days (poise) | 1.2 | 1.2 | 1.2 | 1.2 | 1.3 | 1.4 |

TABLE 8

| Example | 1 | 2 | 3 | 4 | 5 |
|---|---|---|---|---|---|
| cured film properties | | | | | |
| distinctness of image | ○ | ○ | ○ | ○ | ○ |
| weathering resistance (3000 hr) | 94% | 96% | 92% | 96% | 93% |
| stain property in atmospheric exposure (ΔL) | −1.34 | −1.28 | −1.02 | −0.98 | −1.21 |
| oil ink stain resistance | | | | | |
| black | ○ | ○ | ○ | ○ | ○ |
| red | ○ | ○ | ○ | ○ | ○ |
| moisture resistance | ○ | ○ | ○ | ○ | ○ |
| acid resistance | non abnormal | non abnormal | non abnormal | non abnormal | non abnormal |
| adhesive property | ○ | ○ | ○ | ○ | ○ |

TABLE 9

| Example | 6 | 7 | 8 | 9 | 10 | 11 |
|---|---|---|---|---|---|---|
| cured film properties | | | | | | |
| distinctness of image | ○ | ○ | ○ | ○ | ○ | ○ |
| weathering resistance (3000 hr) | 94% | 95% | 94% | 95% | 95% | 96% |
| stain property in atmospheric exposure (ΔL) | −1.29 | −1.00 | −0.91 | −1.09 | −1.1 | −1.2 |
| oil ink stain resistance | | | | | | |
| black | ○ | ○ | ○ | ○ | ○ | ○ |
| red | ○ | ○ | ○ | ○ | ○ | ○ |
| moisture resistance | ○ | ○ | ○ | ○ | ○ | ○ |
| acid resistance | non abnormal | non abnormal | non abnormal | non abnormal | non abnormal | non abnormal |
| adhesive property | ○ | ○ | ○ | ○ | ○ | ○ |

Application to precoat metal

Example 12

(1) Preparation of coating composition

One component coating composition was prepared by charging the mixture of raw materials shown in Table 10 into a sand mill and by dispersing until the particle diameter became to below 10 μm.

(2) Preparation of test piece and Evaluation of cured film properties

An under coating composition, PRECOLOR PRIMER SP-7® (a product of NOF CORPORATION), was applied on the zinc-coated steel plate treated with zinc phosphate in an amount to form a film having dried thickness of 5 μm by a roll coater and the undercoated steel plates were baked at 200° C. of the plate temperature for 40 seconds to produce a test panel. And then, the raw coating composition prepared in above mentioned (1) were diluted with a solvent of SOLVESSO # 150® (a product of Esso Co., aromatic petroleum naphtha) to be the viscosity of 120 seconds at 20° C. by Ford cup No. 4 and were applied on the test panel prepared before by a roll coater. Test pieces were prepared by baking the coated pieces under curing condition of 230° C. of the plate temperature for 50 seconds. Results of the evaluation of cured film properties are shown in Table 11. Uniform cured films having good gloss were prepared. The cured films had excellent weathering resistance, stain property in atmospheric exposure, oil ink stain resistance, moisture resistance, acid resistance and adhesive property.

(3) Evaluation of storage stability

The coating compositions prepared in above mentioned (1) were diluted with SOLVESSO #150® (a product of Esso Co., aromatic petroleum naphtha) to the viscosity of 1 poise (measured by rotary viscometer method of Japanese Industrial Standard K-5400 (1990) 4.5.3 type at 20° C.) and stored in a sealed condition at 40° C. After the diluting coating compositions were stored for 30 days at 40° C., the viscosities were measured. Results listed in Table 10 show that the increase of viscosity was very slight and the coating composition had the excellent storage stability.

TABLE 10

| Example | 12 |
|---|---|
| formulation ratio (parts by weight) | |
| (A) | |
| compound A - 1 | 50.5 |
| compound A - 2 | — |
| (B) | |
| compound B - 1 | 98.4 |
| compound B - 2 | — |
| (C) | |
| compound C-1 | 11.7 |
| untreated material | — |
| (D) | |
| compound D - 1 | 5.7 |
| compound D - 2 | — |
| (E) | |
| compound E | — |
| others | |
| titanium dioxide[1] | 78.0 |
| storage stability (40° C.) | |
| initial viscosity (poise) | 1.0 |
| viscosity after 30 days (poise) | 1.2 | note [1]Titanium dioxide JR-602 ® : a product of Teikoku Kako Co., Ltd., titanium dioxide of rutile type

TABLE 11

| Example | 12 |
|---|---|
| cured film properties | |
| distinctness of | ○ |

TABLE 11-continued

| Example | 12 |
|---|---|
| image | |
| weathering resistance (1000 hr) | 92% |
| stain property in atmospheric exposure (ΔL) | −1.19 |
| oil ink stain resistance | |
| black | ○ |
| red | ○ |
| moisture resistance | ○ |
| acid resistance | non abnormal |
| adhesive property | ○ |

Comparative Example 1

In Comparative Example 1, a coating composition was prepared in formulation ratio shown in Table 12 in the same method as described in Examples 1 through 11 except that the dispersing component of the inorganic oxide sol of ingredient (C) was not used. A test piece was formed by using the obtained coating composition in the same method as described in Examples 1 through 11. A cured film was inferior in stain property in atmospheric exposure and oil ink stain resistance as shown in Table 13.

TABLE 12

| Comparative Example | 1 |
|---|---|
| formulation ratio (parts by weight) | |
| (A) | |
| compound A - 1 | 50.5 |
| compound A - 2 | — |
| (B) | |
| compound B - 1 | 98.4 |
| compound B - 2 | — |
| (C) | |
| compound C - 1 | — |
| untreated material | — |
| (D) | |
| compound D - 1 | 5.7 |
| compound D - 2 | — |
| (E) | |
| compound E | — |
| storage stability (40° C.) | |
| initial viscosity (poise) | 1.0 |
| viscosity after 30 days (poise) | 1.2 |

TABLE 13

| Comparative Example | 1 |
|---|---|
| cured film properties | |
| distinctness of image | ○ |
| weathering resistance (3000 hr) | 88% |
| stain property in atmospheric exposure (ΔL) | −9.04 |

TABLE 13-continued

| Comparative Example | 1 |
|---|---|
| oil ink stain resistance | |
| black | Δ |
| red | Δ |
| moisture resistance | ○ |
| acid resistance | non abnormal |
| adhesive property | ○ |

Comparative Example 2

In Comparative Example 2, a clear coating composition was prepared in formulation ratio shown in Table 14 by using the nonblocked type polycarboxylic acid compound.

The storage stability test was conducted by the same method as Examples 1 through 9. The coating composition was gelled after 10 days in Comparative Example 2 as shown in Table 14, because both of carboxyl groups and epoxy groups were not blocked in the crosslinking reaction between these groups, though the cured film properties of Comparative Example 2 is similar to that of Examples 1 through 9 as shown in Table 15.

TABLE 14

| Comparative Example | 2 |
|---|---|
| formulation ratio (parts by weight) | |
| (A) | |
| nonblocked type polycarboxylic acid compound described in Prep. Ex. 1 | 28.6 |
| compound A - 2 | — |
| (B) | |
| compound B - 1 | 98.4 |
| compound B - 2 | — |
| (C) | |
| compound C - 1 | 11.7 |
| untreated material | — |
| (D) | |
| compound D - 1 | 5.7 |
| compound D - 2 | — |
| (E) | |
| compound E | — |
| storage stability (40° C.) | |
| initial viscosity (poise) | 1.0 |
| viscosity after 30 days (poise) | gelation after 10 days |

TABLE 15

| Comparative Example | 2 |
|---|---|
| cured film properties | |
| distinctness of image | ○ |
| weathering resistance (3000 hr) | 88% |
| stain property in atmospheric exposure (ΔL) | −1.39 |

TABLE 15-continued

| Comparative Example | 2 |
|---|---|
| oil ink stain resistance | |
| black | ○ |
| red | ○ |
| moisture resistance | ○ |
| acid resistance | non abnormal |
| adhesive property | ○ |

Application to a multilayer cured film containing a over clear coat Examples 13 through 21

(1) Preparation of over clear coating compositions

Over clear coating compositions were prepared by mixing raw materials shown in Table 16.

(2) Preparation of test piece and Evaluation of cured film properties

Cationic electrodeposition coat AQUA No.4200® (a product of NOF CORPORATION) was applied by electrodeposition to a soft steel plate treated with zinc phosphate in the amount to form a film having dried thickness of 20 μm and the coated plate was baked at 175° C. for 25 minutes. Intermediate coat EPICO No. 1500CP Sealer® (a product of NOF CORPORATION) was applied to the prepared plate by air spraying in the amount to form a film having dried thickness of 40 μm and the plate was baked at 140° C. for 30 minutes. Silver metallic base coating composition, BELCOAT No. 6000® (a product of NOF CORPORATION) was applied to the intermediated coat by air spraying in 2 stages with interval of 1 minute 30 seconds in the amount to form a film having dried thickness of 15 μm and the coated pieces were set at 20° C. for 3 minutes. Further, the clear coating composition comprising an acrylic resin/aminoplast resin coating composition, BELCOAT No. 6000 CLEAR COAT® (a product of NOF CORPORATION, ratio by weight of acrylic resin to aminoplast resin: 70/30 ) was applied by air spraying in the amount to form a film having dried thickness of 30 μm and the plate was baked at 140° C. for 30 minutes. Furthermore, as over clear coating compositions, the raw coating compositions prepared by above mentioned (1) were diluted with thinner (xylene) to a viscosity required for spraying (25 seconds at 20° C. by Ford cup No. 4) and applied to the test panels prepared before by air spraying in the amount to form a film having dried thickness of 10 μm and the test pieces were baked at the curing condition of 140° C. for 30 minutes to obtain multilayer test pieces. Results of the evaluation of cured film properties are shown in Tables 17 and 18. In all cases, uniform cured films having good gloss were prepared. All the cured films under baking condition of 140° C. had excellent disinctness of image, weathering resistance, stain property in atmospheric exposure, oil ink stain resistance, moisture resistance, acid resistance and adhesive property.

TABLE 16

| formulation ratio | Example | | | | | | | | |
|---|---|---|---|---|---|---|---|---|---|
| (parts by weight) | 13 | 14 | 15 | 16 | 17 | 18 | 19 | 20 | 21 |
| (A) | | | | | | | | | |
| compound A-1 | 50.5 | 50.5 | 50.5 | 50.5 | — | — | — | — | 10.1 |
| compound A-2 | — | — | — | — | 29.8 | 29.8 | 29.8 | 29.8 | — |
| (B) | | | | | | | | | |
| compound B-1 | 98.4 | 98.4 | 98.4 | 98.4 | — | — | — | — | — |
| compound B-2 | — | — | — | — | 108.4 | 108.4 | 108.4 | 108.4 | — |
| (C) | | | | | | | | | |
| compound C-1 | 11.7 | — | 35.0 | 58.3 | 27.3 | — | 54.6 | 81.9 | 62.2 |
| untreated material | — | 10.0 | — | — | — | 23.4 | — | — | — |
| (D) | | | | | | | | | |
| compound D-1 | 5.7 | 5.7 | 5.7 | 5.7 | — | — | — | — | 10.2 |
| compound D-2 | — | — | — | — | 7.5 | 7.5 | 7.5 | 7.5 | — |
| (E) | | | | | | | | | |
| compound E | — | — | — | — | — | — | — | — | 202.5 |

TABLE 17

| cured film | Example | | | | |
|---|---|---|---|---|---|
| properties | 13 | 14 | 15 | 16 | 17 |
| distinctness of image | ○ | ○ | ○ | ○ | ○ |
| weathering resistance (3000 hr) | 96% | 98% | 92% | 95% | 92% |
| stain property in atmospheric exposure (ΔL) | −1.52 | −1.35 | −1.32 | −1.03 | −1.51 |
| oil ink stain resistance | | | | | |
| black | ○ | ○ | ○ | ○ | ○ |
| red | ○ | ○ | ○ | ○ | ○ |
| moisture resistance | ○ | ○ | ○ | ○ | ○ |
| acid resistance | non abnormal | non abnormal | non abnormal | non abnormal | non abnormal |
| adhesive property | ○ | ○ | ○ | ○ | ○ |

TABLE 18

| cured film properties | Example | | | |
|---|---|---|---|---|
| | 18 | 19 | 20 | 21 |
| distinctness of image | ○ | ○ | ○ | ○ |
| weathering resistance (3000 hr) | 97% | 96% | 95% | 97% |
| stain property in atmospheric exposure (ΔL) | −1.55 | −1.29 | −1.04 | −1.28 |
| oil ink stain resistance | | | | |
| black | ○ | ○ | ○ | ○ |
| red | ○ | ○ | ○ | ○ |
| moisture resistance | ○ | ○ | ○ | ○ |
| acid resistance | non abnormal | non abnormal | non abnormal | non abnormal |
| adhesive property | ○ | ○ | ○ | ○ |

The following is explanation of Examples of multilayer cured films with alternate coating compositions.

Evaluation of the properties of the cured films with alternate coating compositions were conducted as follows.

(1) 60 degree specular gloss

The 60 degree specular gloss (Gs 60°) of the cured film was measured according to Japanese Industrial Standard Z-8741.

(2) weathering resistance (accelerated weathering resistance test)

By using a weathering resistance tester of sunshine carbon arc lamp (Japanese Industrial Standard D-0205 5.4), a test piece was exposed and a retention of the 60 degree specular gloss (%) (Japanese Industrial Standard K-5400 (1990) 7.6) of the cured film was measured.

(3) xylene rubbing resistance

On a test piece, a flannel soaked with xylene was rubbed by reciprocating 100 times. The surface condition of the test piece was observed by visual and was evaluated in the following standard.

○: The change of the gloss and the surface condition of the test piece was not observed compared with an original test piece.

Δ: The change of the gloss of the test piece was observed in small portions compared with an original test piece.

X: The change of the gloss of the test piece was remarkably observed compared with an original test piece.

(4) acid resistance

The acid resistance test was conducted according to Japanese Industrial Standard K -5400 8.22 and the acid resistance was evaluated in the following standard.

○: The change of the gloss and the discoloration of the test piece was not observed compared with an original test piece.

Δ: The change of the gloss and the discoloration of the test piece was observed in small portions compared with an original test piece.

X: The change of the gloss and the discoloration of the test piece was remarkably observed compared with an original test piece.

(5) alkali resistance

The alkali resistance test was conducted according to Japanese Industrial Standard K-5400 8.21 and the alkali resistance was evaluated in the following standard.

○: The change of the gloss and the discoloration of the test piece was not observed compared with an original test piece.

Δ: The change of the gloss and the discoloration of the test piece was observed in small portions compared with an original test piece.

X: The change of the gloss and the discoloration of the test piece was remarkably observed compared with an original test piece.

(6) pencil hardness

The pencil hardness was measured according to Japanese Industrial Standard K-5400 8.4.2.

Disinctness of image, moisture resistance, oil ink stain resistance and adhesive property were measured by the same method as the measurement method of properties of the cured films which were obtained by using the coating compositions comprising the thermosetting compositions of the present invention.

Preparation Example 11

Into a reaction vessel equipped with a stirrer, a thermometer, a reflux condenser and a dropping funnel, 50 parts by weight of xylene and 50 parts by weight of isobutyl-acetate were charged and the mixture was heated to keep at the temperature of 110° C.

To the mixture kept at 110° C., a mixture of 61 parts by weight of methyl-methacrylate, 19 parts by weight of butyl-acrylate, 19 parts by weight of 2-hydroxyethyl-methacrylate, 1 part by weight of methacrylic acid and 2 parts by weight of 2,2'-azobis (2-methylbutyronitrile) was added by dropping for 2 hours with maintaining refluxing condition. After the completion of dropping, the mixture was kept stirring at 110° C. for 1 hour and a mixture of 0.2 parts by weight of 2,2'-azobis (2-methylbutyronitrile) and 2 parts by weight of isobutyl-acetate was added and the mixture was kept stirring for further 1 hour. After completion of polymerization, a resin solution containing 50.2 percent by weight of non-volatile material was obtained.

The obtained resin had a glass transition temperature of 50° C., a number average molecular weight of 4,800, a hydroxyl value of 80 mgKOH/g and an acid value of 7 mgKOH/g.

Preparation Examples 12 through 24

By using solvents, monomers and polymerization initiators in kind and the amount shown in Tables 19 to 22, resin solutions were prepared in the same method as described in Preparation example 11.

The properties of the obtained resins were shown in Tables 19 through 22.

TABLE 19

| | Preparation Example | | | |
|---|---|---|---|---|
| | 11 | 12 | 13 | 14 |
| initial (parts by weight) | | | | |
| xylene | 50 | 50 | 50 | 50 |
| isobutyl-acetate | 50 | 50 | 50 | 50 |
| dropping (parts by weight) | | | | |
| methyl-methacrylate | 61 | 70 | 78 | 80 |
| butyl-acrylate | 19 | 10 | 2 | — |
| cyclohexyl-methacrylate | — | — | — | — |
| isobornyl-methacrylate | — | — | — | — |
| 2-hydroxyethyl-methacrylate | 19 | 19 | 19 | 19 |
| FM-2[1)] | — | — | — | — |
| methacrylic acid | 1 | 1 | 1 | 1 |
| styrene | — | — | — | — |
| acrylonitrile | — | — | — | — |
| ABMBN[2)] | 2 | 2 | 2 | 2 |

TABLE 19-continued

| | Preparation Example | | | |
|---|---|---|---|---|
| | 11 | 12 | 13 | 14 |
| additional (parts by weight) | | | | |
| ABMBN[2] | 0.2 | 0.2 | 0.2 | 0.2 |
| isobutyl-acetate | 2 | 2 | 2 | 2 |
| total (parts by weight) | 204.2 | 204.2 | 204.2 | 204.2 |
| non-volatile matter concentration (weight %) | 50.2 | 50.1 | 50.0 | 50.2 |
| resin properties | | | | |
| glass transition temperature (° C.) | 50 | 70 | 90 | 95 |
| number average molecular weight | 4800 | 4800 | 4700 | 4800 |
| hydroxyl value (mgKOH/g) | 80 | 80 | 80 | 80 |
| acid value (mgKOH/g) | 7 | 7 | 7 | 7 | notes
[1]FM-2: ε-caprolactone-modified hydroxyethylmethacrylate (trade name, a product of Daicel Chemical Industries, Ltd.)
[2]ABMBN: 2,2'-azobis (2-methylbutyronitrile)

TABLE 20

| | Preparation Example | | | |
|---|---|---|---|---|
| | 15 | 16 | 17 | 18 |
| initial (parts by weight) | | | | |
| xylene | 50 | 50 | 50 | 50 |
| isobutyl-acetate | 50 | 50 | 50 | 50 |
| dropping (parts by weight) | | | | |
| methyl-methacrylate | 75 | 63 | 71 | 67 |
| butyl-acrylate | 12 | 8 | 10 | 11 |
| cyclohexyl-methacrylate | — | — | — | — |
| isobornyl-methacrylate | — | — | — | — |
| 2-hydroxyethyl-methacrylate | 12 | 28 | 18.7 | 18.9 |
| FM-2[1] | — | — | — | — |
| methacrylic acid | 1 | 1 | 0.3 | 3.1 |
| styrene | — | — | — | — |
| acrylonitrile | — | — | — | — |
| ABMBN[2] | 2 | 2 | 2 | 2 |
| additional (parts by weight) | | | | |
| ABMBN[2] | 0.2 | 0.2 | 0.2 | 0.2 |
| isobutyl-acetate | 2 | 2 | 2 | 2 |
| total (parts by weight) | 204.2 | 204.2 | 204.2 | 204.2 |
| non-volatile matter concentration (weight %) | 50.3 | 50.0 | 50.2 | 50.1 |
| resin properties | | | | |
| glass transition temperature (° C.) | 70 | 70 | 70 | 70 |
| number average molecular weight | 5000 | 4700 | 4900 | 4800 |
| hydroxyl value (mgKOH/g) | 50 | 120 | 80 | 80 |
| acid value (mgKOH/g) | 7 | 7 | 2 | 20 | notes
[1]FM-2: ε-caprolactone-modified hydroxyethylmethacrylate (trade name, a product of Daicel Chemical Industries, Ltd.)
[2]ABMBN: 2,2'-azobis (2-methylbutyronitrile)

TABLE 21

| | Preparation Example | | | |
|---|---|---|---|---|
| | 19 | 20 | 21 | 22 |
| initial (parts by weight) | | | | |
| xylene | 50 | 50 | 50 | 50 |
| isobutyl-acetate | 50 | 50 | 50 | 50 |

TABLE 21-continued

| | Preparation Example | | | |
|---|---|---|---|---|
| | 19 | 20 | 21 | 22 |
| dropping (parts by weight) | | | | |
| methyl-methacrylate | 70 | 21 | 42 | — |
| butyl-acrylate | 10 | 6 | 6 | — |
| cyclohexyl-methacrylate | — | 51 | 30 | — |
| isobornyl-methacrylate | — | — | — | 80 |
| 2-hydroxyethyl-methacrylate | 19 | 21 | 21 | 19 |
| FM-2[1] | — | — | — | — |
| methacrylic acid | 1 | 1 | 1 | 1 |
| styrene | — | — | — | — |
| acrylonitrile | — | — | — | — |
| ABMBN[2] | 1 | 2 | 2 | 2 |
| additional (parts by weight) | | | | |
| ABMBN[2] | 0.2 | 0.2 | 0.2 | 0.2 |
| isobutyl-acetate | 2 | 2 | 2 | 2 |
| total (parts by weight) | 203.2 | 204.2 | 204.2 | 204.2 |
| non-volatile matter concentration (weight %) | 50.2 | 50.2 | 50.2 | 50.1 |
| resin properties | | | | |
| glass transition temperature (° C.) | 70 | 70 | 73 | 99 |
| number average molecular weight | 12000 | 4900 | 5000 | 4600 |
| hydroxyl value (mgKOH/g) | 80 | 90 | 90 | 80 |
| acid value (mgKOH/g) | 7 | 6 | 6 | 7 | notes
[1]FM-2: ε-caprolactone-modified hydroxyethylmethacrylate (trade name, a product of Daicel Chemical Industries, Ltd.)
[2]ABMBN: 2,2'-azobis (2-methylbutyronitrile)

TABLE 22

| | Preparation example | |
|---|---|---|
| | 23 | 24 |
| initial (parts by weight) | | |
| xylene | 50 | 50 |
| isobutyl-acetate | 50 | 50 |
| dropping (parts by weight) | | |
| methyl-methacrylate | 34 | 20 |
| butyl-acrylate | — | — |
| cyclohexyl-methacrylate | 35 | 15 |
| isobornyl-methacrylate | — | — |
| 2-hydroxyethyl-methacrylate | 10 | 10 |
| FM-2[1] | 20 | 20 |
| methacrylic acid | 1 | 1 |
| styrene | — | 17 |
| acrylonitrile | — | 17 |
| ABMBN[2] | 2 | 2 |
| additional (parts by weight) | | |
| ABMBN[2] | 0.2 | 0.2 |
| isobutyl-acetate | 2 | 2 |
| total (parts by weight) | 204.2 | 204.2 |
| non-volatile matter concentration (weight %) | 50.2 | 50.2 |
| resin properties | | |
| glass transition temperature (° C.) | 58 | 59 |
| number average molecular weight | 5000 | 4900 |
| hydroxyl value (mgKOH/g) | 74 | 74 |
| acid value (mgKOH/g) | 7 | 7 | notes
[1]FM-2: ε-caprolactone-modified hydroxyethylmethacrylate (trade name, a product of Daicel Chemical Industries, Ltd.)
[2]ABMBN: 2,2'-azobis (2-methylbutyronitrile)

Preparation Example 25

Into a reaction vessel which is equipped with a stirrer, a thermometer, a reflux condenser and a tube for separation, 400 parts by weight of isophthalic acid, 181.2 parts by weight of hexahydrophthalic anhydride, 243.7 parts by weight of neopentylglycol and 175.1 parts by weight of trimethylolpropane were charged. The mixture was heat and maintained at 180° C. for 5 hours to remove distillated water from the tube for separation. And then, the synthesis temperature was increased up to 200 to 220° C. When the acid value became 10 mgKOH/g, polymerization was finished and the reaction mixture was cooled to 80° C. Further, 895 parts by weight of xylene was added in the reaction mixture and the mixture was cooled to room temperature. A resin solution containing a nonvolatile matter of 50.2% by weight was prepared.

The obtained resin had a glass transition temperature of 50° C., a number average molecular weight of 4,000, a hydroxyl value of 100 mgKOH/g and an acid value of 10 mgKOH/g.

Example 22

(1) Preparation of clear film forming composition

By mixing 45.0 parts by weight of the resin solution obtained in Preparation Example 11, 4.5 parts by weight of cyclohexanone, 41.2 parts by weight of the surface-treated silica sol obtained in Preparation Example 7, 0.8 parts by weight of TINUVIN 900® (a product of Ciba-Geigy Co., an ultraviolet absorber), 0.2 parts by weight of TINUVIN 292® (a product of Ciba-Geigy Co., an hinderedamine antioxidant), 1.0 parts by weight of BYK-358® (a product of BYK Chemie, a leveling agent), 1.0 parts by weight of 1 percent by weight solution of SCAT-8® (a product of Sankyo Organic Synthesis Co. Ltd., a tin curing catalyst) and 6.3 parts by weight of DURANATE THA-100® (a product of Asahi Chemical Industry Co., Ltd., a polymer of hexamethylenediisocyanate) under stirring, a clear film forming composition was prepared.

(2) Preparation of test piece and Evaluation of cured film properties

Cationic electrodeposition coat AQUA No.4200® (a product of NOF CORPORATION) was applied by electrodeposition to a soft steel plate treated with zinc phosphate in the amount to form a film having dried thickness of 20 μm and the coated plate was baked at 175° C. for 25 minutes. Intermediate coat EPICO No. 1500CP Sealer® (a product of NOF CORPORATION) was applied to the prepared plate by air spraying in the amount to form a film having dried thickness of 40 μm and the plate was baked at 140° C. for 30 minutes. Silver metallic base coating composition, BELCOAT No. 6000® (a product of NOF CORPORATION) was applied to the intermediated coat by air spraying in 2 stages with interval of 1 minute 30 seconds in the amount to form a film having dried thickness of 15 μm and the coated panel was set at 20° C. for 3 minutes. Further, the raw coating composition prepared by above mentioned (1) was diluted with thinner (xylene) to a viscosity required for spraying (25 seconds at 20° C. by Ford cup No. 4) and applied to the test panel prepared before by air spraying and the test panel was baked at the curing condition of 80° C. for 30 minutes to obtain test pieces having a multilayer cured film. Results of the evaluation of cured film properties are shown in Table 29. Uniform cured film having good gloss was prepared. The cured film under baking condition of 80° C. had excellent 60 degree specular gloss, disinctness of image, weathering resistance, moisture resistance, xylene rubbing resistance, acid resistance, alkali resistance, oil ink stain resistance, pencil hardness and adhesive property.

Examples 23 through 46

After clear film forming compositions were prepared in formulation ratio shown in Tables 23 to 28 in the same method as described in Examples 22, multilayer cured films were formed on the test panels.

Results of the evaluation of cured film properties are shown in Tables 29 to 33. In all cases, uniform cured films having good gloss were prepared. All the cured films under curing conditions shown in Tables 23 to 28 had excellent 60 degree specular gloss, disinctness of image, weathering resistance, moisture resistance, xylene rubbing resistance, acid resistance, alkali resistance, oil ink stain resistance, pencil hardness and adhesive property.

TABLE 23

| | Example | | | |
|---|---|---|---|---|
| | 22 | 23 | 24 | 25 |
| formulation ratio (parts by weight) | | | | |
| resin solution | | | | |
| kind (Preparation Example) | Prep. Ex. 11 | Prep. Ex. 12 | Prep. Ex. 13 | Prep. Ex. 14 |
| formulation weight | 45.0 | 45.0 | 49.6 | 46.9 |
| silica sol | | | | |
| untreated silica sol | — | 41.2 | — | — |
| Preparation Ex. 7 | 41.2 | — | 29.0 | 15.7 |
| curing agent | | | | |
| DURANATE THA-100 | 6.3 | 6.3 | — | — |
| DURANATE 24A-100[1] | — | — | — | 9.9 |
| DESMODUR BL-3175[2] | — | — | 13.4 | — |
| solvent | | | | |
| cyclohexanone | 4.5 | 4.5 | 5.0 | 6.5 |
| additive | | | | |
| TINUVIN 900 | 0.8 | 0.8 | 0.8 | 0.8 |
| TINUVIN 292 | 0.2 | 0.2 | 0.2 | 0.2 |
| BYK-358 | 1.0 | 1.0 | 1.0 | 1.0 |
| curing catalyst | | | | |
| SCAT-8 (10% by weight solution) | — | — | 1.0 | — |
| SCAT-8 (1% by weight solution) | 1.0 | 1.0 | — | 1.0 |
| Total | 100.0 | 100.0 | 100.0 | 100.0 |
| NCO/OH (mole ratio) | 1.0 | 1.0 | 1.0 | 1.0 |
| silica sol non-volatile matter/total non-volatile matter (percent by weight) | 30.0 | 30.0 | 20.0 | 10.0 |
| baking or forced drying condition | | | | |
| temperature (° C.) | 80 | 80 | 170 | 80 |
| time (minutes) | 30 | 30 | 20 | 30 | notes
DURANATE 24A-100: a product of Asahi Chemical Industies Co. Ltd., a polymer of hexamthylenediisocyanate
DESMODUR BL-3175: a product of Sumitomo Bayer Urethane Co. Ltd., a blocked type polymer of hexamthylenediisocyanate

TABLE 24

| | Example | | | |
|---|---|---|---|---|
| | 26 | 27 | 28 | 29 |
| formulation ratio (parts by weight) | | | | |
| resin solution | | | | |
| kind (Preparation Example) | Prep. Ex. 15 | Prep. Ex. 16 | Prep. Ex. 17 | Prep. Ex. 18 |
| formulation weight | 45.8 | 52.0 | 54.6 | 54.6 |
| silica sol | | | | |
| untreated silica sol Preparation Example 7 | 40.9 | 29.9 | 29.2 | 29.2 |
| curing agent | | | | |
| DURANATE THA-100 | 5.7 | — | 7.7 | 7.7 |
| DURANATE 24A-100[1)] | — | 9.9 | — | — |
| DESMODUR BL-3175[2)] | — | — | — | — |
| solvent | | | | |
| cyclohexanone | 4.6 | 5.2 | 5.5 | 5.5 |
| additive | | | | |
| TINUVIN 900 | 0.8 | 0.8 | 0.8 | 0.8 |
| TINUVIN 292 | 0.2 | 0.2 | 0.2 | 0.2 |
| BYK-358 | 1.0 | 1.0 | 1.0 | 1.0 |
| curing catalyst | | | | |
| SCAT-8 (10% by weight solution) | — | — | — | — |
| SCAT-8 (1% by weight solution) | 1.0 | 1.0 | 1.0 | 1.0 |
| Total | 100.0 | 100.0 | 100.0 | 100.0 |
| NCO/OH (mole ratio) | 1.4 | 0.8 | 1.0 | 1.0 |
| silica sol non-volatile matter/total non-volatile matter (percent by weight) | 30.0 | 20.0 | 20.0 | 20.0 |
| baking or forced drying condition | | | | |
| temperature (° C.) | 80 | 80 | 80 | 80 |
| time (minutes) | 30 | 30 | 30 | 30 |

TABLE 25

| | Example | | | |
|---|---|---|---|---|
| | 30 | 31 | 32 | 33 |
| formulation ratio (parts by weight) | | | | |
| resin solution | | | | |
| kind (Preparation Example) | Prep. Ex. 19 | Prep. Ex. 20 | Prep. Ex. 21 | Prep. Ex. 22 |
| formulation weight | 69.8 | 47.2 | 53.6 | 62.0 |
| silica sol | | | | |
| untreated silica sol Preparation Example 7 | 14.9 | 29.5 | 29.5 | 16.2 |
| curing agent | | | | |
| DURANATE THA-100 | — | — | 8.5 | — |
| DURANATE 24A-100[1)] | 5.3 | — | — | 12.6 |
| DESMODUR BL-3175[2)] | — | 15.7 | — | — |
| solvent | | | | |
| cyclohexanone | 7.0 | 4.7 | 5.4 | 6.2 |
| additive | | | | |
| TINUVIN 900 | 0.8 | 0.8 | 0.8 | 0.8 |
| TINUVIN 292 | 0.2 | 0.1 | 0.2 | 0.2 |
| BYK-358 | 1.0 | 1.0 | 1.0 | 1.0 |
| curing catalyst | | | | |
| SCAT-8 (10% by weight solution) | — | 1.0 | — | — |
| SCAT-8 (1% by weight solution) | 1.0 | — | 1.0 | 1.0 |
| Total | 100.0 | 100.0 | 100.0 | 100.0 |
| NCO/OH (mole ratio) | 0.6 | 1.1 | 1.1 | 1.6 |
| silica sol non-volatile matter/total non-volatile matter (percent by weight) | 10.0 | 20.0 | 20.0 | 10.0 |
| baking or forced drying condition | | | | |
| temperature (° C.) | 80 | 170 | 80 | 80 |
| time (minutes) | 30 | 20 | 30 | 30 |

TABLE 26

| | Example | | |
|---|---|---|---|
| | 34 | 35 | 36 |
| formulation ratio (parts by weight) | | | |
| resin solution | | | |
| kind (Preparation Example) | Prep. Ex. 23 | Prep. Ex. 24 | Prep. Ex. 25 |
| formulation weight | 36.4 | 21.8 | 47.2 |
| silica sol | | | |
| unsaturated silica sol Preparation Example 7 | 51.9 | 69.9 | 29.5 |
| curing agent | | | |
| DURANATE THA-100 | — | — | — |
| DURANATE 24A-100[1)] | 5.1 | 3.1 | — |
| DESMODUR BL-3175[2)] | — | — | 15.7 |
| solvent | | | |
| cyclohexanone | 3.6 | 2.2 | 4.7 |
| additive | | | |
| TINUVIN 900 | 0.8 | 0.8 | 0.8 |
| TINUVIN 292 | 0.2 | 0.2 | 0.1 |
| BYK-358 | 1.0 | 1.0 | 1.0 |
| curing catalyst | | | |
| SCAT-8 (10% by weight solution) | — | — | 1.0 |
| SCAT-8 (1% by weight solution) | 1.0 | 1.0 | — |
| Total | 100.0 | 100.0 | 100.0 |
| NCO/OH (mole ratio) | 1.2 | 1.2 | 1.0 |
| silica sol non-volatile matter/total non-volatile matter (percent by weight) | 40.0 | 60.0 | 20.0 |

TABLE 26-continued

| | Example | | |
|---|---|---|---|
| | 34 | 35 | 36 |
| baking or forced drying condition | | | |
| temperature (° C.) | 80 | 80 | 80 |
| time (minutes) | 30 | 30 | 30 |

TABLE 27

| | Example | | | | |
|---|---|---|---|---|---|
| | 37 | 38 | 39 | 40 | 41 |
| formulation ratio (parts by weight) | | | | | |
| resin solution | | | | | |
| kind (Preparation Example) | Prep. Ex. 11 | Prep. Ex. 12 | Prep. Ex. 13 | Prep. Ex. 14 | Prep. Ex. 15 |
| formulation weight | 45.0 | 45.0 | 50.0 | 80.0 | 45.0 |
| silica sol | | | | | |
| untreated silica sol | — | 35.9 | — | — | — |
| Preparation Example 7 | 35.9 | — | 33.0 | 5.0 | 40.9 |
| curing agent | | | | | |
| UVAN 220 | 12.6 | 12.6 | — | — | 7.4 |
| UVAN 122 | — | — | — | 6.5 | — |
| CYMEL 370 | — | — | 10.0 | — | — |
| solvent | | | | | |
| cyclohexanone | 4.5 | 4.5 | 5.0 | 6.5 | 4.6 |
| additive | | | | | |
| TINUVIN 900 | 0.8 | 0.8 | 0.8 | 0.8 | 0.8 |
| TINUVIN 292 | 0.2 | 0.2 | 0.2 | 0.2 | 0.2 |
| BYK-358 | 1.0 | 1.0 | 1.0 | 1.0 | 1.0 |
| curing catalyst | | | | | |
| Nacure 4054 | — | — | — | — | 0.1 |
| Total | 100.0 | 100.0 | 100.0 | 100.0 | 100.0 |
| acryl/melamine (weight ratio of non-volatile matter) | 75/25 | 75/25 | 76/24 | 91/9 | 84/16 |
| silica sol non-volatile matter/total non-volatile matter (percent by weight) | 26.3 | 26.3 | 20.0 | 10.0 | 31.2 |
| baking or forced drying condition | | | | | |
| temperature (° C.) | 140 | 140 | 140 | 130 | 140 |
| time (minutes) | 30 | 30 | 20 | 30 | 30 | notes
UVAN 220: a product of Mitsui Toatsu Chemicals, Inc. a melamine resin (non-volatile material 60 percent by weight)
UVAN 122: a product of Mitsui Toatsu Chemicals, Inc. a melamine resin (non-volatile material 60 percent by weight)
CYMEL 370: a product of Mitsui Cytec Co., Ltd., a melamine resin (non-volatile material 80 percent by weight)
Nacure 4054: a products of King Industry Co., Ltd., phosphoric acid type curing catalyst

TABLE 28

| | Example | | | | |
|---|---|---|---|---|---|
| | 42 | 43 | 44 | 45 | 46 |
| formulation ratio (parts by weight) | | | | | |
| resin solution | | | | | |
| kind (Preparation Example) | Prep. Ex. 16 | Prep. Ex. 17 | Prep. Ex. 18 | Prep. Ex. 19 | Prep. Ex. 20 |
| formulation weight | 52.0 | 54.6 | 54.6 | 70.0 | 50.0 |
| silica sol | | | | | |
| unsaturated silica sol Preparation Example 7 | 32.0 | 27.8 | 27.8 | 15.0 | 30.0 |
| curing agent | | | | | |
| UVAN 220 | — | — | — | — | — |
| UVAN 122 | 8.7 | — | — | 6.0 | — |
| CYMEL 370 | — | 10.0 | 10.0 | — | 13.3 |
| solvent | | | | | |
| cyclohexanone | 5.2 | 5.5 | 5.5 | 7.0 | 4.7 |
| additive | | | | | |
| TINUVIN 900 | 0.8 | 0.8 | 0.8 | 0.8 | 0.8 |
| TINUVIN 292 | 0.2 | 0.2 | 0.2 | 0.2 | 0.2 |
| BYK-358 | 1.0 | 1.0 | 1.0 | 1.0 | 1.0 |
| curing catalyst | | | | | |
| Nacure 4054 | 0.1 | 0.1 | 0.1 | — | — |
| Total | 100.0 | 100.0 | 100.0 | 100.0 | 100.0 |
| acryl/melamine (weight ratio of non-volatile matter) | 83/17 | 77/23 | 77/23 | 91/9 | 70/30 |
| silica sol non-volatile matter/total non-volatile matter (percent by weight) | 23.5 | 19.1 | 19.1 | 10.4 | 20.1 |
| baking or forced drying condition | | | | | |
| temperature (° C.) | 140 | 130 | 120 | 140 | 140 |
| time (minutes) | 30 | 30 | 30 | 30 | 30 |

TABLE 29

| | Example | | | | |
|---|---|---|---|---|---|
| cured film properties | 22 | 23 | 24 | 25 | 26 |
| 60° gloss | 93 | 91 | 91 | 86 | 92 |
| distinctness of image | ○ | ○ | ○ | ○ | ○ |
| accelerated weathering test gloss retention (%) | | | | | |
| 1000 hours | 100 | 100 | 100 | 99 | 100 |
| 2000 hours | 99 | 97 | 99 | 99 | 98 |
| 3000 hours | 95 | 95 | 96 | 97 | 95 |
| 4000 hours | 92 | 93 | 93 | 96 | 90 |
| 5000 hours | 91 | 92 | 91 | 93 | 87 |
| 6000 hours | 90 | 92 | 91 | 92 | 85 |
| moisture resistance | ○ | ○ | ○ | ○ | ○ |
| xylene rubbing resistance | ○ | ○ | ○ | ○ | ○ |
| acid resistance | ○ | ○ | ○ | ○ | ○ |
| alkali resistance | ○ | ○ | ○ | ○ | ○ |
| oil ink stain resistance | | | | | |
| black | ○ | ○ | ○ | ○ | ○ |
| red | ○ | ○ | ○ | ○ | ○ |
| pencil hardness (breaking) | 3H | 3H | 4H | 4H | 3H |
| pencil hardness (cloud) | F | H | H~2H | H | H |
| adhesive property | ○ | ○ | ○ | ○ | ○ |

TABLE 30

| cured film properties | Example | | | | |
|---|---|---|---|---|---|
| | 27 | 28 | 29 | 30 | 31 |
| 60° gloss | 91 | 93 | 88 | 90 | 91 |
| distinctness of image | ○ | ○ | ○ | ○ | ○ |
| accelerated weathering test gloss retention (%) | | | | | |
| 1000 hours | 100 | 100 | 98 | 100 | 99 |
| 2000 hours | 98 | 98 | 97 | 98 | 97 |
| 3000 hours | 95 | 95 | 94 | 96 | 93 |
| 4000 hours | 91 | 93 | 90 | 94 | 93 |
| 5000 hours | 90 | 91 | 87 | 93 | 92 |
| 6000 hours | 90 | 88 | 84 | 93 | 90 |
| moisture resistance | ○ | ○ | ○ | ○ | ○ |
| xylene rubbing resistance | ○ | ○ | ○ | ○ | ○ |
| acid resistance | ○ | ○ | ○ | ○ | ○ |
| alkali resistance | ○ | ○ | ○ | ○ | ○ |
| oil ink stain resistance | | | | | |
| black | ○ | ○ | ○ | ○ | ○ |
| red | ○ | ○ | ○ | ○ | ○ |
| pencil hardness (breaking) | 4H | 4H | 4H | 4H | 4H |
| pencil hardness (cloud) | 2H | H | H | H | 2H |
| adhesive property | ○ | ○ | ○ | ○ | ○ |

TABLE 31

| | | Example | | | | |
|---|---|---|---|---|---|---|
| | | 32 | 33 | 34 | 35 | 36 |
| cured film properties | 60° gloss | 91 | 85 | 94 | 94 | 90 |
| | distinctness of image | ○ | ○ | ○ | ○ | ○ |
| | accelerated weathering test gloss retention (%) 1000 hours | 99 | 99 | 99 | 99 | 100 |
| | 2000 hours | 99 | 98 | 97 | 94 | 99 |
| | 3000 hours | 98 | 98 | 93 | 90 | 95 |
| | 4000 hours | 96 | 95 | 90 | 87 | 92 |
| | 5000 hours | 95 | 94 | 84 | 92 | 87 |
| | 6000 hours | 93 | 91 | 82 | 79 | 85 |
| | moisture resistance | ○ | ○ | ○ | ○ | ○ |
| | xylene rubbing resistance | ○ | ○ | ○ | ○ | ○ |
| | acid resistance | ○ | ○ | ○ | ○ | ○ |
| | alkali resistance | ○ | ○ | ○ | ○ | ○ |
| | oil ink stain resistance black | ○ | ○ | ○ | ○ | ○ |
| | red | ○ | ○ | ○ | ○ | ○ |
| | pencil hardness (breaking) | 4H | 4H | 2H | 3H | 4H |
| | pencil hardness (cloud) | H | H~2H | H | H | 2H |
| | adhesive property | ○ | ○ | ○ | ○ | ○ |

TABLE 32

| | | Example | | | | |
|---|---|---|---|---|---|---|
| | | 37 | 38 | 39 | 40 | 41 |
| cured film properties | 60° gloss | 92 | 92 | 91 | 94 | 93 |
| | distinctness of image | ○ | ○ | ○ | ○ | ○ |
| | accelerated weathering test gloss retention (%) 1000 hours | 100 | 99 | 98 | 99 | 100 |
| | 2000 hours | 98 | 99 | 97 | 98 | 98 |
| | 3000 hours | 95 | 97 | 94 | 95 | 95 |
| | 4000 hours | 92 | 96 | 90 | 93 | 90 |
| | 5000 hours | 90 | 93 | 87 | 91 | 87 |
| | 6000 hours | 88 | 90 | 83 | 86 | 81 |
| | moisture resistance | ○ | ○ | ○ | ○ | ○ |
| | xylene rubbing resistance | ○ | ○ | ○ | ○ | ○ |
| | acid resistance | ○ | ○ | ○ | ○ | ○ |
| | alkali resistance | ○ | ○ | ○ | ○ | ○ |
| | oil ink stain resistance black | ○ | ○ | ○ | ○ | ○ |
| | red | ○ | ○ | ○ | ○ | ○ |

TABLE 32-continued

| | Example | | | | |
|---|---|---|---|---|---|
| | 37 | 38 | 39 | 40 | 41 |
| pencil hardness (breaking) | 3H | 3H | 3H | 3H | 3H |
| pencil hardness (cloud) | H | H | H | H | H |
| adhesive property | ○ | ○ | ○ | ○ | ○ |

TABLE 33

| | | | Example | | | | |
|---|---|---|---|---|---|---|---|
| | | | 42 | 43 | 44 | 45 | 46 |
| cured film properties | 60° gloss | | 91 | 95 | 90 | 91 | 92 |
| | distinctness of image | | ○ | ○ | ○ | ○ | ○ |
| | accelerated weathering test gloss retention (%) | 1000 hours | 99 | 100 | 99 | 100 | 100 |
| | | 2000 hours | 98 | 98 | 97 | 99 | 97 |
| | | 3000 hours | 96 | 96 | 93 | 94 | 95 |
| | | 4000 hours | 93 | 94 | 93 | 92 | 93 |
| | | 5000 hours | 91 | 93 | 89 | 89 | 90 |
| | | 6000 hours | 88 | 91 | 87 | 86 | 87 |
| | moisture resistance | | ○ | ○ | ○ | ○ | ○ |
| | xylene rubbing resistance | | ○ | ○ | ○ | ○ | ○ |
| | acid resistance | | ○ | ○ | ○ | ○ | ○ |
| | alkali resistance | | ○ | ○ | ○ | ○ | ○ |
| | oil ink stain resistance | black | ○ | ○ | ○ | ○ | ○ |
| | | red | ○ | ○ | ○ | ○ | ○ |
| | pencil hardness (breaking) | | 2H | 2H | 2H | 3H | 3H |
| | pencil hardness (cloud) | | F | H | H | H | H |
| | adhesive property | | ○ | ○ | ○ | ○ | ○ |

Example 51

(1) Preparation of over clear coating composition

By mixing 45.0 parts by weight of the resin solution obtained in Preparation Example 11, 4.5 parts by weight of cyclohexanone, 41.2 parts by weight of the surface-treated silica sol obtained in Preparation Example 7, 0.8 parts by weight of TINUVIN 900® (a product of Ciba-Geigy Co., an ultraviolet absorber), 0.2 parts by weight of TINUVIN 292® (a product of Ciba-Geigy Co., an hinderedamine antioxidant), 1.0 parts by weight of BYK-358® (a product of BYK Chemie, a leveling agent), 1.0 parts by weight of 1 percent by weight solution of SCAT-8® (a product of Sankyo Organic Synthesis Co. Ltd., a tin curing catalyst) and 6.3 parts by weight of DURANATE THA-100® (a product of Asahi Chemical Industry Co., Ltd., a polymer of hexamethylenediisocyanate) under stirring, a coating composition comprising an inorganic sol was prepared.

(2) Preparation of test piece and Evaluation of cured film properties

Cationic electrodeposition coat AQUA No. 4200® (a product of NOF CORPORATION) was applied by electrodeposition to a soft steel plate treated with zinc phosphate in the amount to form a film having dried thickness of 20 μm and the coated plate was baked at 175° C. for 25 minutes. Intermediate coat EPICO No. 1500CP Sealer® (a product of NOF CORPORATION) was applied to the prepared plate by air spraying in the amount to form a film having dried thickness of 40 μm and the plate was baked at 140° C. for 30 minutes. Silver metallic base coating composition, BEL-COAT No. 6000® (a product of NOF CORPORATION) was applied on the intermediated coat by air spraying in 2 stages with interval of 1 minute 30 seconds in the amount to form a film having dried thickness of 15 μm and the coated panel was set at 20° C. for 3 minutes. Further, a clear coating composition comprising an acrylic resin/aminoplast resin coating composition, BELCOAT No. 6000 CLEAR COAT®

(a product of NOF CORPORATION, ratio by weight of acrylic resin to aminoplast resin: 70/30) was applied by air spraying in the amount to form a film having dried thickness of 30 μm and the panel was baked at 140° C. for 30 minutes.

Furthermore, as an over clear coating composition, the raw coating composition prepared by above mentioned (1) was diluted with thinner (xylene) to a viscosity required for spraying (25 seconds at 20° C. by Ford cup No.4) and applied to the test panel prepared before by air spraying and the test panel was baked at the curing condition of 80° C. for 30 minutes to obtain a multilayer test piece.

Results of the evaluation of cured film properties are shown in Table 34. Uniform cured film having good gloss was prepared. The cured film under baking condition of 80° C. had excellent 60 degree specular gloss, disinctness of image, weathering resistance, moisture resistance, xylene rubbing resistance, acid resistance, alkali resistance, oil ink stain resistance, pencil hardness and adhesive property.

Examples 52 through 75

After coating compositions comprising an inorganic sol were prepared in formulation ratio shown in Tables 23 to 28 in the same method as described in Examples 51, multilayer cured films were formed on the test panels.

Results of the evaluation of cured film properties and curing conditions of over clear coats are shown in Tables 34 to 38. In all cases, uniform cured films having good gloss were prepared. All the cured films under baking conditions shown in Tables 23 to 28 had excellent 60 degree specular gloss, disinctness of image, weathering resistance, moisture resistance, xylene rubbing resistance, acid resistance, alkali resistance, oil ink stain resistance, pencil hardness and adhesive property.

TABLE 34

| | | | Example | | | | |
|---|---|---|---|---|---|---|---|
| | | | 51 | 52 | 53 | 54 | 55 |
| cured film pro- per- ties | 60° gloss | | 93 | 91 | 91 | 86 | 92 |
| | distinctness of image | | ○ | ○ | ○ | ○ | ○ |
| | accelerated weathering test gloss retention (%) | 1000 hours | 100 | 100 | 100 | 99 | 100 |
| | | 2000 hours | 99 | 97 | 99 | 99 | 98 |
| | | 3000 hours | 93 | 93 | 95 | 95 | 93 |
| | | 4000 hours | 91 | 91 | 92 | 93 | 91 |
| | | 5000 hours | 90 | 90 | 90 | 92 | 84 |
| | | 6000 hours | 88 | 90 | 89 | 90 | 83 |
| | moisture resistance | | ○ | ○ | ○ | ○ | ○ |
| | xylene rubbing resistance | | ○ | ○ | ○ | ○ | ○ |
| | acid resistance | | ○ | ○ | ○ | ○ | ○ |
| | alkali resistance | | ○ | ○ | ○ | ○ | ○ |
| | oil ink stain resistance | black | ○ | ○ | ○ | ○ | ○ |
| | | red | ○ | ○ | ○ | ○ | ○ |
| | pencil hardness (breaking) | | 2H | 2H | 3H | 3H | 3H |
| | pencil hardness (cloud) | | HB | F | H~2H | H | H |
| | adhesive property | | ○ | ○ | ○ | ○ | ○ |

TABLE 35

| | | | Example | | | | |
|---|---|---|---|---|---|---|---|
| | | | 56 | 57 | 58 | 59 | 60 |
| cured film pro- per- ties | 60° gloss | | 91 | 93 | 88 | 90 | 91 |
| | distinctness of image | | ○ | ○ | ○ | ○ | ○ |
| | accelerated weathering test gloss retention (%) | 1000 hours | 100 | 100 | 98 | 100 | 99 |
| | | 2000 hours | 98 | 98 | 97 | 98 | 97 |
| | | 3000 hours | 94 | 95 | 93 | 94 | 93 |
| | | 4000 hours | 90 | 92 | 90 | 93 | 92 |

TABLE 35-continued

| | | | Example | | | | |
|---|---|---|---|---|---|---|---|
| | | | 56 | 57 | 58 | 59 | 60 |
| | | 5000 hours | 88 | 90 | 87 | 90 | 90 |
| | | 6000 hours | 86 | 88 | 83 | 88 | 87 |
| | moisture resistance | | ○ | ○ | ○ | ○ | ○ |
| | xylene rubbing resistance | | ○ | ○ | ○ | ○ | ○ |
| | acid resistance | | ○ | ○ | ○ | ○ | ○ |
| | alkali resistance | | ○ | ○ | ○ | ○ | ○ |
| | oil ink stain resistance | black | ○ | ○ | ○ | ○ | ○ |
| | | red | ○ | ○ | ○ | ○ | ○ |
| | pencil hardness (breaking) | | 4H | 4H | 4H | 4H | 4H |
| | pencil hardness (cloud) | | 2H | H | F | F | H |
| | adhesive property | | ○ | ○ | ○ | ○ | ○ |

TABLE 36

| | | | Example | | | | |
|---|---|---|---|---|---|---|---|
| | | | 61 | 62 | 63 | 64 | 65 |
| cured film pro- per- ties | 60° gloss | | 91 | 85 | 94 | 94 | 90 |
| | distinctness of image | | ○ | ○ | ○ | ○ | ○ |
| | accelerated weathering test gloss retention (%) | 1000 hours | 99 | 99 | 99 | 99 | 100 |
| | | 2000 hours | 99 | 98 | 95 | 93 | 97 |
| | | 3000 hours | 95 | 95 | 90 | 91 | 93 |
| | | 4000 hours | 93 | 93 | 88 | 85 | 90 |
| | | 5000 hours | 90 | 90 | 83 | 84 | 85 |
| | | 6000 hours | 88 | 87 | 80 | 75 | 80 |
| | moisture resistance | | ○ | ○ | ○ | ○ | ○ |
| | xylene rubbing resistance | | ○ | ○ | ○ | ○ | ○ |
| | acid resistance | | ○ | ○ | ○ | ○ | ○ |
| | alkali resistance | | ○ | ○ | ○ | ○ | ○ |
| | oil ink stain resistance | black | ○ | ○ | ○ | ○ | ○ |
| | | red | ○ | ○ | ○ | ○ | ○ |
| | pencil hardness (breaking) | | 3H | 3H | H | 2H | 3H |
| | pencil hardness (cloud) | | H | H~2H | F | F | H |
| | adhesive property | | ○ | ○ | ○ | ○ | ○ |

TABLE 37

| | | | Example | | | | |
|---|---|---|---|---|---|---|---|
| | | | 66 | 67 | 68 | 69 | 70 |
| cured film pro- perties | 60° gloss | | 92 | 92 | 91 | 94 | 93 |
| | distinctness of image | | ○ | ○ | ○ | ○ | ○ |
| | accelerated weathering test gloss retention (%) | 1000 hours | 100 | 99 | 98 | 99 | 100 |
| | | 2000 hours | 98 | 99 | 97 | 98 | 98 |
| | | 3000 hours | 94 | 96 | 93 | 95 | 94 |
| | | 4000 hours | 92 | 94 | 90 | 92 | 90 |
| | | 5000 hours | 90 | 92 | 88 | 90 | 85 |
| | | 6000 hours | 87 | 90 | 84 | 85 | 80 |
| | moisture resistance | | ○ | ○ | ○ | ○ | ○ |
| | xylene rubbing resistance | | ○ | ○ | ○ | ○ | ○ |
| | acid resistance | | ○ | ○ | ○ | ○ | ○ |
| | alkali resistance | | ○ | ○ | ○ | ○ | ○ |
| | oil ink stain resistance | black | ○ | ○ | ○ | ○ | ○ |
| | | red | ○ | ○ | ○ | ○ | ○ |
| | pencil hardness (breaking) | | 3H | 3H | 3H | 3H | 3H |
| | pencil hardness (cloud) | | F | F | F | F | H |
| | adhesive property | | ○ | ○ | ○ | ○ | ○ |

TABLE 38

| | | Example | | | | |
|---|---|---|---|---|---|---|
| | | 71 | 72 | 73 | 74 | 75 |
| cured film | 60° gloss | 91 | 95 | 90 | 91 | 92 |
| | distinctness of image | ○ | ○ | ○ | ○ | ○ |

TABLE 38-continued

|  |  |  | Example | | | | |
|---|---|---|---|---|---|---|---|
|  |  |  | 71 | 72 | 73 | 74 | 75 |
| pro- | accelerated | 1000 hours | 99 | 100 | 99 | 100 | 100 |
| perties | weathering test | 2000 hours | 98 | 98 | 97 | 99 | 97 |
|  | gloss retention | 3000 hours | 96 | 96 | 93 | 94 | 95 |
|  | (%) | 4000 hours | 93 | 94 | 93 | 92 | 93 |
|  |  | 5000 hours | 91 | 93 | 89 | 89 | 90 |
|  |  | 6000 hours | 88 | 91 | 87 | 86 | 87 |
|  | moisture resistance | | ◯ | ◯ | ◯ | ◯ | ◯ |
|  | xylene rubbing resistance | | ◯ | ◯ | ◯ | ◯ | ◯ |
|  | acid resistance | | ◯ | ◯ | ◯ | ◯ | ◯ |
|  | alkali resistance | | ◯ | ◯ | ◯ | ◯ | ◯ |
|  | oil ink stain | black | ◯ | ◯ | ◯ | ◯ | ◯ |
|  | resistance | red | ◯ | ◯ | ◯ | ◯ | ◯ |
|  | pencil hardness (breaking) | | H | H | H | 2H | 2H |
|  | pencil hardness (cloud) | | F | F | F | H | H |
|  | adhesive property | | ◯ | ◯ | ◯ | ◯ | ◯ |

The thermosetting composition of the invention gives cured products having excellent chemical properties, physical properties, stain resistance, stain-removing property, weathering resistance, light resistance, chemical resistance and moisture resistance and is excellent in storage stability. The thermosetting composition is favorably utilized in the field of coatings, ink, adhesive and molded plastics. Particularly, when it is utilized as a top coating material, it discharges a small amount of organic solvents into air and gives excellent appearance to the finished articles. Further, when they are utilized as a clear coating composition or an over clear coating composition for a multilayer paint film, it can give a multilayer paint film having excellent appearance, weathering resistance, stain resistance, stain-removing property, chemical resistance and moisture resistance. Accordingly, it is advantageously applied to industrial coating fields such as coatings for automobiles and coatings for precoat steels.

What is claimed is:

1. A thermosetting composition which comprises:
    (A) a compound having in the molecule two or more functional groups of the formula (I):

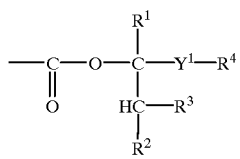

(1)

wherein $R^1$, $R^2$ and $R^3$ are each selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ are optionally bonded with each other to form a heterocyclic structure which comprises $Y^1$ as the hetero atom component;
    (B) a compound having in the molecule two or more reactive functional groups which can form chemical bond with the functional groups of the compound (A), the reactive functional groups are groups of at least one member selected from the group consisting of an epoxy group, an oxazoline group, a silanol group, an alkoxysilane group, a hydroxyl group, an amino group, an imino group, an isocyanate group, a blocked isocyanate group, a cyclocarbonate group, a vinyl ether group, a vinyl thioether group, an aminomethylol group, an alkylated aminomethylol group, an acetal group and a ketal group; and
    (C) at least one inorganic oxide sol selected from the group consisting of an aluminum oxide sol, a silica sol which is surface-treated with a silane coupling agent, a zirconium oxide sol and an antimony oxide sol; and optionally, (D) a thermal latent acid catalyst which is activated during curing of the composition by heating, the thermal latent acid catalyst is at least one member selected from the group consisting of a compound prepared by neutralizing a Bronsted acid or a Lewis acid with a Lewis base, a mixture of a Lewis acid and a trialkylphosphate, an ester of a sulfonic acid, an ester of phosphoric acid, an onium compound and a compound comprising (i) an epoxy group-containing compound, (ii) a sulfur atom-containing compound and (iii) a Lewis acid, and optionally (iv) a carboxylic acid, a carboxylic anhydride or a carboxylic acid and a carboxylic anhydride, and
    further comprising a solvent, said solvent consisting essentially of an organic solvent.

2. The thermosetting composition as claimed in claim 1, wherein the ingredient (A) and/or the ingredient (B) are a polymer of an α,β-unsaturated compound.

3. The thermosetting composition as claimed in claim 1, wherein the ingredient (A) and/or the ingredient (B) are a polyester resin.

4. A thermosetting composition which comprises:
    (E) a self-crosslinkable compound having in the molecule
        (α) one or more functional groups of the formula (2):

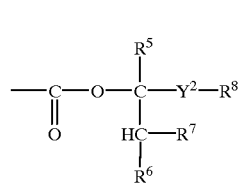

(2)

wherein $R^5$, $R^6$ and $R^7$ are each selected from the group consisting of a hydrogen atom and an organic group of 1 to 18 carbon atoms, $R^8$ is an organic group of 1 to 18 carbon atoms, $Y^2$ is selected from the group consisting of an oxygen atom and a sulfur atom and $R^7$ and $R^8$ are optionally bonded with each other to form a heterocyclic structure which comprises $Y^2$ as the hetero atom component; and (μ) one or more reactive functional groups which can form chemical bonds with the functional groups (α); and
    (C) at least one inorganic oxide sol selected from the group consisting of an aluminum oxide sol, a silica sol which is surface-treated with a silane coupling agent, a zirconium oxide sol and an antimony oxide sol; and optionally, (A) a compound having in the molecule two or more functional groups of the formula (1):

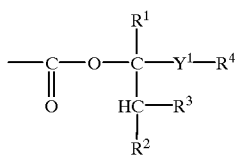

wherein $R^1$, $R^2$ and $R^3$ are each selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ are optionally bonded with each other to form a heterocyclic structure which comprises $Y^1$ as the hetero atom component; and/or (B) a compound having in the molecule two or more reactive functional groups which can form chemical bonds with either one or both of the functional group of the formula (2) and the functional group of the formula (1); and (D) a thermal latent acid catalyst which is activated during curing of the composition by heating, the thermal latent acid catalyst is at least one member selected from the group consisting of a compound prepared by neutralizing a Bronsted acid or a Lewis acid with a Lewis base, a mixture of a Lewis acid and a trialkylphosphate, an ester of a sulfonic acid, an ester of phosphoric acid, an onium compound, and a compound comprising (i) an epoxy group-containing compound, (ii) a sulfur atom-containing compound and (iii) a Lewis acid, and optionally (iv) a carboxylic acid, a carboxylic anhydride or a carboxylic acid and a carboxylic anhydride, wherein the reactive functional groups of said (E) and optionally said (B) are groups of at least one member selected from the group consisting of an epoxy group, an oxazoline group, a silanol group, an alkoxysilane group, a hydroxyl group, an amino group, an imino group, an unblocked isocyanate group, a blocked isocyanate group, a cyclocarbonate group, a vinyl ether group, a vinyl thioether group, an aminomethylol group, an alkylated aminomethylol group, an acetal group and a ketal group, and further comprising a solvent, said solvent consisting essentially of an organic solvent.

5. A method of coating which comprises applying a top coating composition comprising a pigment and the thermosetting composition claimed in any one of claims 1, 2, 3 or 4 on a substrate, the amount of the pigment being in the range from 0 to 300 parts by weight based on 100 parts by weight of the total nonvolatile matter of the resin ingredient (A) and the curing agent ingredient (B).

6. A method of coating which comprises coating a substrate with a multilayer paint film by applying a colored film forming composition on the substrate to form a base coat, followed by applying a top coat clear film forming composition on the base coat to form a clear top coat, wherein the top coat clear film forming composition alone or both of the top coat clear film forming composition and the colored film forming composition is at least one member selected from the group consisting of a coating composition comprising the thermosetting composition claimed in any one of claims 1, 2, 3 or 4 and a coating composition comprising (A') an acrylic polyol resin and/or a polyester polyol resin, (B') one or more compounds selected from the group consisting of a polyisocyanate compound having two or more isocyanate groups per molecule, a polyblocked isocyanate compound having two or more blocked isocyanate groups per molecule and an aminoplast resin, and (C) at least one inorganic oxide sol selected from the group consisting of an aluminum oxide sol, a silica sol which is surface-treated with a silane coupling agent, a zirconium oxide sol and an antimony oxide sol, said (C) containing 0.1 to 60% by weight of nonvolatile matter based on a total amount of nonvolatile matter of said (A') and said (B').

7. A method of coating as claimed in claim 6, wherein the top coat clear film forming composition alone or both of the top coat clear film forming composition and the colored film forming composition is a coating composition comprising (A') an acrylic polyol resin and/or a polyester polyol resin, (B') one or more compounds selected from the group consisting of a polyisocyanate compound having two or more isocyanate groups per molecule, a polyblocked isocyanate compound having two or more blocked isocyanate groups per molecule and an aminoplast resin, and (C) a silica sol which is surface-treated with a silane coupling agent, said (C) containing 0.1 to 60% by weight of nonvolatile matter based on a total amount of nonvolatile matter of said (A') and said (B').

8. A method of coating which comprises applying a colored base coating composition on a substrate, followed by applying a clear coating composition on the resultant uncured base coat to form a clear coat thereon, and baking the base coat and the clear coat, and then applying an over clear coating composition on the clear coat to form an over clear coat thereon and baking the over clear coat, wherein the clear coating composition is an acrylic resin/aminoplast resin coating composition, and the over clear coating composition is at least one member selected from the group consisting of a coating composition comprising the thermosetting composition claimed in any one of claims 1, 2, 3 or 4 and a coating composition comprising (A') an acrylic polyol resin and/or a polyester polyol resin, (B') one or more compounds selected from the group consisting of a polyisocyanate compound having two or more isocyanate groups per molecule, a polyblocked isocyanate compound having two or more blocked isocyanate groups per molecule and an aminoplast resin , and (C) at least one inorganic oxide sol selected from the group consisting of an aluminum oxide sol, a silica sol which is surface treated with a silane coupling agent, a zirconium oxide sol and an antimony oxide sol, said (C) containing 0.1 to 60% by weight of nonvolatile matter based on a total amount of nonvolatile matter of said (A') and said (B').

9. A method of coating as claimed in claim 8, wherein the over clear coating composition is a coating composition comprising (A') an acrylic polyol resin and/or a polyester polyol resin, (B') one or more compounds selected from the group consisting of a polyisocyanate compound having two or more isocyanate groups per molecule, a polyblocked isocyanate compound having two or more blocked isocyanate groups per molecule and an aminoplast resin, and (C) a silica sol which is surface-treated with a silane coupling agent said (C) containing 0.1 to 60% by weight of nonvolatile matter based on a total amount of nonvolatile matter of said (A') and said (B').

10. A coated article applied by the method of coating claimed in claim 7.

11. A coated article applied by the method of coating claimed in claim 5.

12. A coated article applied by the method of coating claimed in claim 6.

13. A coated article applied by the method of coating claimed in claim 8.

14. A coated particle applied by the method of coating claimed in claim 9.

* * * * *